United States Patent
Terrazas et al.

(10) Patent No.: US 10,885,097 B2
(45) Date of Patent: Jan. 5, 2021

(54) METHODS AND APPARATUS TO PROFILE GEOGRAPHIC AREAS OF INTEREST

(71) Applicant: The Nielsen Company (US), LLC, New York, NY (US)

(72) Inventors: Alejandro Terrazas, Santa Cruz, CA (US); Peter Lipa, Tucson, AZ (US); Jonathan Sullivan, Hurricane, UT (US); Michael Sheppard, Brooklyn, NY (US); Wei Xie, Woodridge, IL (US)

(73) Assignee: THE NIELSEN COMPANY (US), LLC, New York, NY (US)

( * ) Notice: Subject to any disclaimer, the term of this patent is extended or adjusted under 35 U.S.C. 154(b) by 825 days.

(21) Appl. No.: 14/866,347

(22) Filed: Sep. 25, 2015

(65) Prior Publication Data
US 2017/0091627 A1    Mar. 30, 2017

(51) Int. Cl.
G06N 20/00    (2019.01)
G06F 16/29    (2019.01)
G06N 20/20    (2019.01)
G06F 16/50    (2019.01)

(52) U.S. Cl.
CPC ............. G06F 16/50 (2019.01); G06F 16/29 (2019.01); G06N 20/00 (2019.01); G06N 20/20 (2019.01)

(58) Field of Classification Search
None
See application file for complete search history.

(56) References Cited

U.S. PATENT DOCUMENTS

| 3,240,138 A | 3/1966 | Goddard |
| 5,299,115 A | 3/1994 | Fields et al. |
| 5,341,439 A | 8/1994 | Hsu |
| 5,361,201 A | 11/1994 | Jost et al. |
| 5,414,462 A | 5/1995 | Veatch |
| 5,682,525 A | 10/1997 | Bouve et al. |
| 5,949,988 A | 9/1999 | Feisullin et al. |
| 6,035,255 A | 3/2000 | Murphy et al. |

(Continued)

FOREIGN PATENT DOCUMENTS
WO    2013085821    6/2013

OTHER PUBLICATIONS

Liao, X. et al., "Quadratically gated mixture of experts for incomplete data classification," Proc. of the 24th Intl. Conf. on Machine Learning (2007) 8 pp. (Year: 2007).*

(Continued)

*Primary Examiner* — Kakali Chaki
*Assistant Examiner* — Brian M Smith
(74) *Attorney, Agent, or Firm* — Hanley, Flight & Zimmerman, LLC

(57) ABSTRACT

Methods and apparatus to generate data for geographic areas are disclosed. An example method includes identifying a first geographic area for which a database does not include a model, determining a first data element of the first geographic area, identifying a first trained model corresponding to a second geographic area with the first data element, identifying a second trained model corresponding to a third geographic area with the first data element, mixing the first trained model and the second trained model to generate a composite model, and using the composite model to represent the first geographic area in the database.

20 Claims, 10 Drawing Sheets

(56) References Cited

U.S. PATENT DOCUMENTS

| | | | |
|---|---|---|---|
| 6,137,909 A | 10/2000 | Greineder et al. | |
| 6,308,177 B1 | 10/2001 | Israni et al. | |
| 6,385,622 B2 | 5/2002 | Bouve et al. | |
| 6,535,210 B1 | 3/2003 | Ellenby et al. | |
| 6,665,449 B1 | 12/2003 | He et al. | |
| 6,850,946 B1 | 2/2005 | Rappaport et al. | |
| 6,970,578 B1 | 11/2005 | Strand | |
| 7,055,107 B1 | 5/2006 | Rappaport et al. | |
| 7,069,232 B1 | 6/2006 | Fox et al. | |
| 7,107,038 B2 | 9/2006 | Fitch et al. | |
| 7,164,883 B2 | 1/2007 | Rappaport et al. | |
| 7,324,666 B2 | 1/2008 | Zoken et al. | |
| 7,342,722 B2 | 3/2008 | White | |
| 7,587,276 B2 | 9/2009 | Gold et al. | |
| 7,711,360 B2 | 5/2010 | Dundar et al. | |
| 7,711,687 B2 | 5/2010 | Rappaport et al. | |
| 7,844,417 B2 | 11/2010 | Du | |
| 7,856,312 B2 | 12/2010 | Coombes et al. | |
| 7,873,524 B2 | 1/2011 | Wenzlau et al. | |
| 8,296,388 B2 | 10/2012 | Blagsvedt et al. | |
| 8,341,010 B1 | 12/2012 | Gadberry et al. | |
| 8,385,591 B1 | 2/2013 | Anguelov et al. | |
| 8,429,156 B2 | 4/2013 | Buchmueller et al. | |
| 8,447,107 B1 | 5/2013 | Dhua et al. | |
| 8,489,445 B1 | 7/2013 | Berg et al. | |
| 8,649,632 B2 | 2/2014 | Neophytou et al. | |
| 8,660,383 B1 | 2/2014 | Callari et al. | |
| 8,694,359 B2 | 4/2014 | Algranati | |
| 8,761,435 B2 | 6/2014 | Chen | |
| 8,818,076 B2 | 8/2014 | Shenkar et al. | |
| RE45,264 E | 12/2014 | Meadow et al. | |
| 8,938,686 B1 | 1/2015 | Erenrich et al. | |
| 9,002,114 B2 | 4/2015 | Miller et al. | |
| 9,082,014 B2 | 7/2015 | Terrazas et al. | |
| 9,137,918 B2 | 9/2015 | Chuang et al. | |
| 9,230,167 B2 | 1/2016 | Miller et al. | |
| 9,378,509 B2 | 6/2016 | Terrazas et al. | |
| 9,536,148 B2 | 1/2017 | Gross et al. | |
| 9,547,866 B2 | 1/2017 | Terrazas et al. | |
| 9,613,455 B1 | 4/2017 | Nelson et al. | |
| 2002/0029226 A1 | 3/2002 | Li et al. | |
| 2002/0145620 A1 | 10/2002 | Smith et al. | |
| 2003/0101063 A1 | 5/2003 | Sexton et al. | |
| 2003/0177055 A1 | 9/2003 | Zimmerman, Jr. et al. | |
| 2004/0005085 A1 | 1/2004 | Andersen | |
| 2004/0260599 A1 | 12/2004 | Ziegele et al. | |
| 2005/0060299 A1 | 3/2005 | Filley et al. | |
| 2005/0203768 A1 | 9/2005 | Florance et al. | |
| 2006/0069606 A1 | 3/2006 | Kaczkowski et al. | |
| 2006/0100777 A1 | 5/2006 | Staton et al. | |
| 2006/0178929 A1 | 8/2006 | Boardman et al. | |
| 2007/0190502 A1 | 8/2007 | Chladny | |
| 2007/0282665 A1 | 12/2007 | Buehler et al. | |
| 2007/0282792 A1 | 12/2007 | Bailly et al. | |
| 2008/0240513 A1 | 10/2008 | Xie et al. | |
| 2008/0243906 A1 | 10/2008 | Peters | |
| 2008/0281695 A1 | 11/2008 | Whitehead | |
| 2008/0294372 A1 | 11/2008 | Hunt et al. | |
| 2009/0115785 A1 | 5/2009 | Grandhi et al. | |
| 2009/0164294 A1 | 6/2009 | Hu et al. | |
| 2009/0187464 A1 | 7/2009 | Bai et al. | |
| 2009/0198681 A1 | 8/2009 | Burnstein et al. | |
| 2009/0222424 A1 | 9/2009 | Van | |
| 2009/0231359 A1 | 9/2009 | Bass, II et al. | |
| 2010/0079336 A1 | 4/2010 | Skibiski et al. | |
| 2010/0111374 A1 | 5/2010 | Stoica | |
| 2010/0121680 A1 | 5/2010 | Elam et al. | |
| 2010/0189312 A1 | 7/2010 | Nielsen et al. | |
| 2011/0085697 A1 | 4/2011 | Clippard et al. | |
| 2011/0243438 A1 | 10/2011 | Hoppe et al. | |
| 2012/0079061 A1 | 3/2012 | Krebs | |
| 2012/0094639 A1 | 4/2012 | Carlson et al. | |
| 2012/0263377 A1 | 10/2012 | Finlayson et al. | |
| 2013/0004065 A1 | 1/2013 | Ma | |
| 2013/0010299 A1 | 1/2013 | Bray et al. | |
| 2013/0060540 A1 | 3/2013 | Frahm et al. | |
| 2013/0094700 A1 | 4/2013 | Mellor et al. | |
| 2013/0103617 A1* | 4/2013 | Desai | G06N 20/00 706/12 |
| 2013/0124441 A1 | 5/2013 | Quaile et al. | |
| 2013/0148895 A1 | 6/2013 | Miller et al. | |
| 2013/0226666 A1 | 8/2013 | Terrazas et al. | |
| 2013/0226667 A1 | 8/2013 | Terrazas et al. | |
| 2013/0226842 A1* | 8/2013 | Chu | G06N 5/025 706/12 |
| 2013/0243250 A1 | 9/2013 | France et al. | |
| 2013/0301915 A1 | 11/2013 | Terrazas et al. | |
| 2014/0019302 A1 | 1/2014 | Meadow et al. | |
| 2014/0072209 A1 | 3/2014 | Brumby et al. | |
| 2014/0114984 A1 | 4/2014 | Kadyrov et al. | |
| 2014/0153835 A1 | 6/2014 | Pritt | |
| 2014/0172560 A1 | 6/2014 | Satyavolu et al. | |
| 2014/0238801 A1 | 8/2014 | Lai | |
| 2014/0270355 A1 | 9/2014 | Terrazas et al. | |
| 2014/0279784 A1 | 9/2014 | Casalaina et al. | |
| 2014/0340394 A1 | 11/2014 | Mattila | |
| 2014/0340395 A1 | 11/2014 | Mattila | |
| 2015/0016730 A1 | 1/2015 | Miller et al. | |
| 2015/0086107 A1 | 3/2015 | Dedeoglu et al. | |
| 2015/0089523 A1 | 3/2015 | Volovich et al. | |
| 2015/0100907 A1 | 4/2015 | Erenrich et al. | |
| 2015/0170377 A1 | 6/2015 | Thomas et al. | |
| 2015/0269598 A1 | 9/2015 | Terrazas et al. | |
| 2016/0063516 A1 | 3/2016 | Terrazas et al. | |
| 2016/0140589 A1 | 5/2016 | Deshpande et al. | |
| 2016/0283955 A1 | 9/2016 | Terrazas et al. | |
| 2016/0358190 A1 | 12/2016 | Terrazas et al. | |
| 2016/0379388 A1 | 12/2016 | Rasco et al. | |
| 2017/0091627 A1 | 3/2017 | Terrazas et al. | |

OTHER PUBLICATIONS

Paass, G. et al., "Bayesian regression mixtures of experts in geo-referenced data," Intelligent Data Analysis (Jan. 2003) 11 pp. (Year: 2003).*

Wang, C. et al, "Classification with incomplete data using dirichlet process priors," J. Machine Learning Research, vol. 11 (Mar. 2010) pp. 3269-3311. (Year: 2010).*

Xue, Y. et al., "Multi-task learning for classification with dirichlet process priors," Journal of Machine Learning Research, vol. 8 (2007) pp. 35-63. (Year: 2007).*

Oshiro, T. M. et al., "How many trees in a random forest?", Lecture Notes in Computer Science (Jul. 2012) pp. 154-168. (Year: 2012).*

Griffith, D. et al., "Statistical analysis of spatial data in the presence of missing observations: a methodological guide and an application to urban census data" Environment and Planning A, vol. 21 (Dec. 1989) pp. 1511-1523. (Year: 1989).*

Garcia-Laencina, P. et al., "Classifying patterns with missing values using Multi-Task Learning Perceptrons," Expert Systems with Applications, vol. 40 (2013) pp. 1333-1341. (Year: 2013).*

Peuhkurinen, J. et al., "Estimation of forest stand characteristics using spectral histograms derived from an ikonos satellite image," Photogrammetric Engineering and Remote Sensing, vol. 74, No. 11 (Nov. 2008) pp. 1335-1341. (Year: 2008).*

Malinen, J. et al., "Predicting the internal quality and value of Norway spruce trees by using two non-parametric nearest neighbor methods," Forest Products Journal, vol. 53, No. 4 (Apr. 2003) pp. 85-94. (Year: 2003).*

Chi, G. et al.,. "Spatial regression models for demographic analysis," Popul. Res. Policy Rev., vol. 27 (2008) pp. 17-42. (Year: 2008).*

Wang, H. et al., "Mapping rubinia pseudoacacia forest health conditions by using combined spectral, spatial, and textural information extracted from ikonos imagery and random forest classifier," Remote Sensing, vol. 2015, No. 7 (Jul. 2015) pp. 9020-9044. (Year: 2015).*

Akar, O. et al., "Classification of multspectral images using random forest algorithms," Journal of Geodesy and Geoinformation, vol. 1, No. 2 (Nov. 2012) pp. 105-112. (Year: 2012).*

(56) References Cited

OTHER PUBLICATIONS

Rulloni, V. et al., "Large gap imputation in remote sensed imagery of the environment," Computational Statistics and Data Analysis, vol. 56 (2012) pp. 2388-2403. (Year: 2012).*
Wang, L. et al., "Neural network classification of mangrove species from multi-seasonal ikonos imagery," Photogrammetric Engineering & Remote Sensing, vol. 74, No. 7 (Jul. 2008) pp. 921-927. (Year: 2008).*
Yang, Xiaojun, "Satellite Monitoring of Urban Spatial Growth in the Atlanta Metropolitan Area," Jul. 2002, Photogrammetric Engineering and Remote Sensing, vol. 68, No. 7, pp. 725-734.
United States Patent and Trademark Office, "Notice of Allowance," issued in connection with U.S. Appl. No. 14/500,365, dated Oct. 9, 2015, 9 pages.
United States Patent and Trademark Office, "Non-Final Office Action," issued in connection with U.S. Appl. No. 14/733,711, dated Nov. 24, 2015, 15 pages.
United States Patent and Trademark Office, "Notice of Allowance," issued in connection with U.S. Appl. No. 13/829,644, dated Feb. 22, 2016, 12 pages.
United States Patent and Trademark Office, "Corrected Notice of Allowability," issued in connection with U.S. Appl. No. 14/500,365, dated Nov. 25, 2015, 2 pages.
United States Patent and Trademark Office, "Final Office Action," issued in connection with U.S. Appl. No. 14/733,711, dated May 6, 2016, 8 pages.
United States Patent and Trademark Office, "Corrected Notice of Allowability," issued in connection with U.S. Appl. No. 13/829,644, dated Mar. 30, 2016, 3 pages.
United States Patent and Trademark Office, "Final Office Action," issued in connection with U.S. Appl. No. 13/774,790, dated Jun. 15, 2016, 65 pages.
United States Patent and Trademark Office, "Notice of Allowance," issued in connection with U.S. Appl. No. 14/733,711, dated Sep. 20, 2016, 17 pages.
United States Patent and Trademark Office, "Supplemental Notice of Allowability," issued in connection with U.S. Appl. No. 13/829,625, dated Jun. 12, 2015, 9 pages.
United States Patent and Trademark Office, "Non-Final Office Action," issued in connection with U.S. Appl. No. 13/829,644, dated Jul. 9, 2015, 68 pages.
Levy, "Retailing Management—Chapter 8," 2008, 70 pages, McGraw-Hill/Irwin, Seventh Edition.
United States Patent and Trademark Office, "Notice of Allowance," issued in connection with U.S. Appl. No. 13/314,989, dated Feb. 20, 2015, 23 pages.
United States Patent and Trademark Office, "Non-Final Office Action," issued in connection with U.S. Appl. No. 13/774,784, dated Apr. 9, 2015, 35 pages.
United States Patent and Trademark Office, "Notice of Allowance," issued in connection with U.S. Appl. No. 13/829,625, dated Mar. 4, 2015, 19 pages.
Abelson et al., "Targeting Direct Cash Transfers to the Extremely Poor," Aug. 24-27, 2014, 10 pages.
United States Patent and Trademark Office, "Non-Final Office Action," issued in connection with U.S. Appl. No. 13/774,790, dated Jan. 5, 2015, 45 pages.
Hantula, "Guest Editorial: Evolutionary Psychology and Consumption," Psychology & Marketing, vol. 20(9), Sep. 2003, 8 pages.
United States Patent and Trademark Office, "Non-Final Office Action," issued in connection with U.S. Appl. No. 13/829,625, dated Oct. 9, 2014, 27 pages.
Bhaduri, Budhendra, et al. "LandScan USA: a high-resolution geospatial and temporal modeling approach for population distribution and dynamics." GeoJournal 69.1-2 (2007), 15 pages.
Simonneaux, Vincent, et al. "The use of high-resolution image time series for crop classification and evapotranspiration estimate over an irrigated area in central Morocco." International Journal of Remote Sensing 29.1 (2008), 25 pages.
Patent Cooperation Treaty, "International Search Report and Written Opinion," issued in connection with Application No. PCT/US2014/026235, dated Oct. 24, 2014, 9 pages.
Lo, "Modeling the Population of China Using DMSP Operational Linescan System Nighttime Data," Photogrammetric Engineering & Remote Sensing, vol. 67, No. 9, Sep. 2001, 11 pages.
Krishnamachari et al., "Hierarchical clustering algorithm for fast image retrieval," Jan. 1999, 9 pages, Part of the IS&T/SPIE Conference on Storage and Retrieval for Image and Video Databases VII, San Jose, California.
Wan et al., "A New Approach to Image Retrieval with Hierarchical Color Clustering," May 30, 1998, IEEE, 16 pages.
Krebs et al., "Optimal Prey Selection in the Great Tit (Parus Major)", Animal Behaviour, vol. 25, No. 1, Feb. 1977, (9 pages).
Charnov, Eric L., "Optimal Foraging: Attack Strategy of a Mantid", The American Naturalist, vol. 110, No. 971, Jan.-Feb. 1976, (11 pages).
Charnov, Eric L., "Optimal Foraging, the Marginal Value Theorem", Theoretical Population Biology, vol. 9, No. 2, Apr. 1976, (8 pages).
Smith, Eric Alden, "Anthropological Applications of Optimal Foraging Theory: A Critical Review", Current Anthropology, vol. 24, No. 5, Dec. 1983 (28 pages).
Orun, Ahmet B., "Automated Identification of Man-Made Textural Features on Satellite Imagery by Bayesian Networks", School of Computer Science, University of Birmingham, Birmingham, United Kingdom, Feb. 2004, (6 pages).
Segal, Donald B., "Retail Trade Area Analysis: Concepts and New Approaches", Directions Magazine—All Things Location, Nov. 18, 1998, (10 pages).
U.S. Appl. No. 61/603,756, filed Feb. 27, 2012, (9 pages).
U.S. Appl. No. 61/602,423, filed Feb. 23, 2012, (40 pages).
U.S. Appl. No. 61/644,850, filed May 9, 2012, (53 pages).
U.S. Appl. No. 13/774,790, filed Feb. 22, 2013, (52 pages).
U.S. Appl. No. 13/829,644, filed Mar. 14, 2013, (55 pages).
U.S. Appl. No. 13/829,625, filed Mar. 14, 2013, (52 pages).
Patent Cooperation Treaty, "Search Report", issued in connection with PCT application PCT/US2012/067414, dated Feb. 13, 2013 (5 pages).
U.S. Appl. No. 13/774,784, filed Feb. 22, 2013, (52 pages).
Patent Cooperation Treaty, "International Preliminary Report on Patentability," issued in connection with Application No. PCT/US2012/067414, dated Jun. 10, 2014, 6 pages.
M.H.B.P.H. Madana, "Improving Land Use Survey Method using High Resolution Satellite Imagery", International Institute for Geo Information Science and Earth Observation (ITC), Mar. 2002, Enschede, The Netherlands, (124 pages).
U.S. Appl. No. 13/314,989, filed Dec. 8, 2011, (38 pages).
United States Patent and Trademark Office, "Notice of Allowance and Fee(s) Due," issued in connection with U.S. Appl. No. 13/314,989, dated May 30, 2014, 41 pages.
Patent Cooperation Treaty, "Written Opinion", issued in connection with PCT application PCT/US2012/067414, dated Feb. 13, 2013 (5 pages).
United States Patent and Trademark Office, "Non-Final Office Action," issued in connection with U.S. Appl. No. 14/473,646, dated Oct. 27, 2017, 93 pages.
United States Patent and Trademark Office, "Final Office Action," issued in connection with U.S. Appl. No. 14/473,646, dated Apr. 18, 2018, 75 pages.
United States Patent and Trademark Office, "Non-Final Office Action," issued in connection with U.S. Appl. No. 14/671,273, dated Oct. 19, 2018, 58 pages.
United States Patent and Trademark Office, "Non-Final Office Action," issued in connection with U.S. Appl. No. 14/866,435, dated Mar. 14, 2018, 64 pages.
United States Patent and Trademark Office, "Final Office Action," issued in connection with U.S. Appl. No. 14/866,435, dated Sep. 11, 2018, 74 pages.
United States Patent and Trademark Office, "Final Office action," issued in connection with U.S. Appl. No. 13/774,784, dated May 20, 2016, 33 pages.

(56) References Cited

OTHER PUBLICATIONS

United States Patent and Trademark Office, "Interview Summary," mailed in connection with U.S. Appl. No. 13/314,989, dated Jan. 28, 2015, 2 pages.

United States Patent and Trademark Office, "Supplemental Notice of Allowability," mailed in connection with U.S. Appl. No. 14/733,711, dated Oct. 20, 2016, 4 pages.

Lu, "Recommendations Based on Purchase Patterns," International Journal of Machine Learning and Computing, vol. 4, No. 6, Dec. 2014, 4 pages.

United States Patent and Trademark Office, "Final Office Action," mailed in connection with U.S. Appl. No. 14/671,273, dated May 24, 2019, 11 pages.

United States Patent and Trademark Office, "Non-final Office Action," mailed in connection with U.S. Appl. No. 14/671,273, dated Mar. 11, 2020, 7 pages.

Tatem et al., "Mapping Populations at Risk: Improving Spatial Demographic Data for Infection Disease Modeling and Metric Derivation," Population Health Metrics, vol. 10, No. 8, 2012, 14 pages.

Nielsen, "PRIZM Segmentation System," 2014, 1 page.

United States Patent and Trademark Office, "Final Office Action," mailed in connection with U.S. Appl. No. 14/671,273, dated Sep. 14, 2020, 8 pages.

\* cited by examiner

METHODS AND APPARATUS TO PROFILE GEOGRAPHIC AREAS OF INTEREST

FIELD OF THE DISCLOSURE

This disclosure relates generally to geography and, more particularly, to methods and apparatus to profile geographic areas of interest.

BACKGROUND

Data indicative of geographic area features such as, for example, real estate developments, retail stores, lifestyle, aggregate or partial demographics, wealth, size, store density, resource density, city type, and other equivalent information has become a valuable resource. When these data are gathered by trained surveyors, monitoring applications, or other like data gathering techniques, it may be referred to as "ground truth" data.

DETAILED DESCRIPTION

Figure 1:
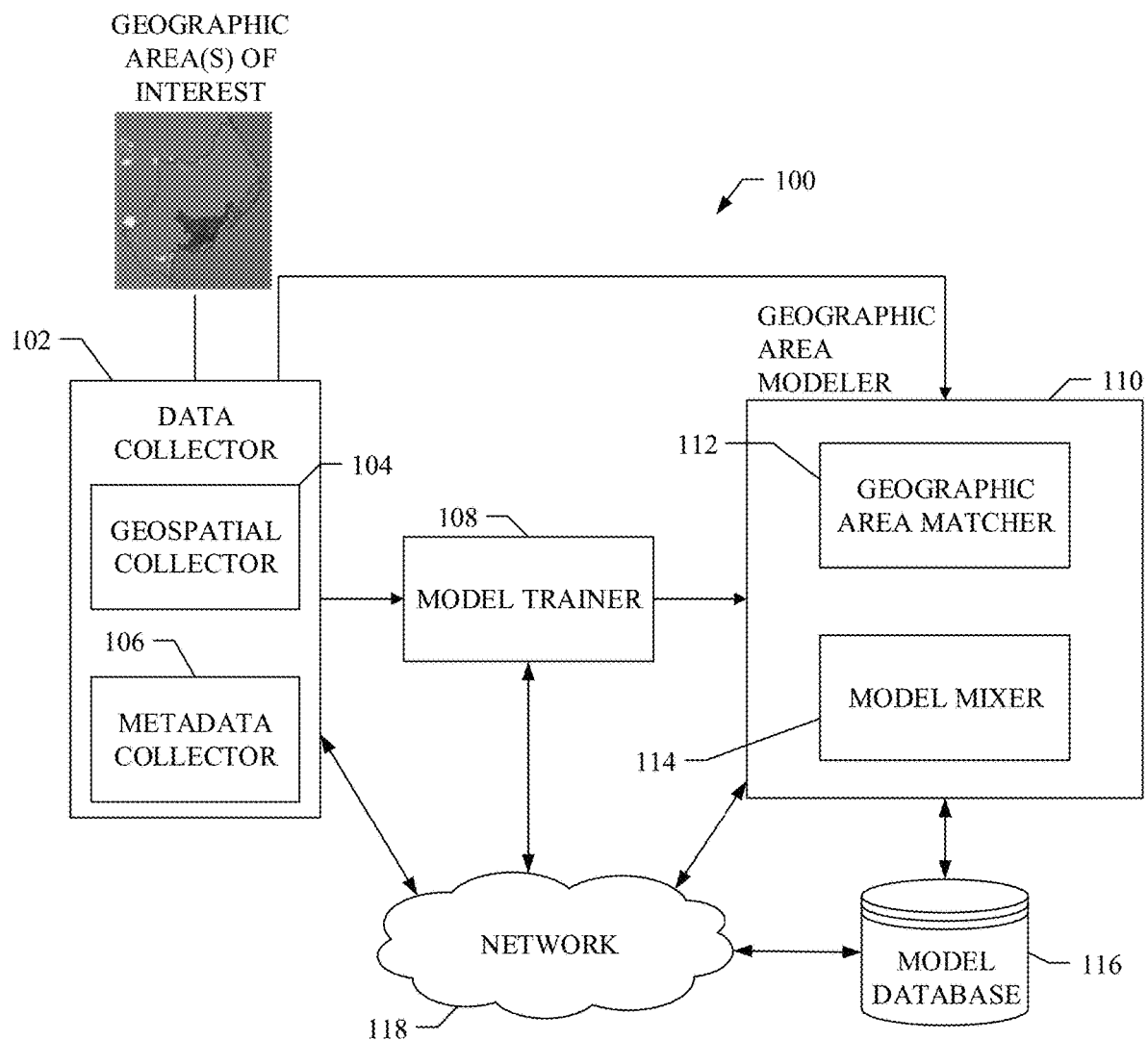
FIG. 1 is a block diagram of an example environment having an example model trainer and an example geographic area modeler constructed in accordance with teachings of this disclosure.

Known techniques for developing geographic data and/or metadata from a geographic area of interest employ human surveyors. Such known techniques involve challenges such as, for example, high costs, low temporal resolution, and/or an inability to determine geographic data and/or metadata in many areas due to dangerous conditions and/or geopolitical factors. In particular, development of useful information regarding geographic areas of the developing world is sometimes impracticable or impossible in view of the dynamic economies of such areas.

Other data gathering techniques involve monitoring applications, which need access to a geographic area of interest in order to monitor related geographic data and/or metadata. These monitoring applications may involve the same challenges as discussed above with regard to human surveying.

Independent of developing data for a geographic area of interest, computational learning techniques apply learning datasets (e.g., training models) to machine learning algorithms such that the machine learning algorithm may subsequently perform accurately on new, unseen examples/tasks. Training a machine learning algorithm takes time and processing power that increases exponentially with the number of models or machine learning algorithms that need to be trained.

Prior to the example methods and apparatus taught herein, applying computational learning techniques to the exorbitant amount of information related to geographic areas of interest with pluralities of varying datasets would be impracticable, if not impossible. In other words, n models would have to be trained with m learning datasets for j unknown geographic areas of interest for t time before the n models would be ready to perform on unknown tasks (e.g., unknown geographic areas).

In some examples, a large amount of d data (e.g., geographic data, geospatial data, metadata, etc.) is required to create a learning dataset. An example learning dataset is a model or plurality of models for a known geographic area. Accordingly, an example learning dataset may have n models trained with d geographic data, geospatial data, and metadata for a particular geographic area (i.e., n×d). To train a model for an unknown geographic area, a large number of learning datasets (m) are required. Thus, m learning datasets with n models trained with d data are used to train n models for the unknown geographic area (i.e., n×m×n×d). If this is done for j unknown geographic areas, then the calculation increases further (i.e., j×n$^2$×m×d). As training models takes t time, the calculation increases even more (i.e., t×j×n$^2$×m×d). Thus, the total time it would take to train n models for j unknown geographic areas increases exponentially with the number of models n and is dependent on at least four other variables.

For example, it would take 5,000,000,000 hours to train models for 20 unknown geographic areas if it takes 1 hour to train a model, 50 models are to be trained for each unknown geographic area, and 1000 geographic areas are used as training sets, each of which have 50 models trained with 100 data elements. In another example, if it only took 3 minutes to train a model, 3 models were to be trained for each unknown geographic area, and 3 geographic areas are used as training sets, each of which have 3 models trained with 3 data elements, it would still take 1029 minutes, or 12 hours and 9 minutes. However, using more models and more training sets drastically improves the accuracy of the performance of a learning algorithm on unseen tasks. Thus, as accuracy of a learning algorithm improves the time involved exponentially scales according to t×j×n$^2$×m×d.

The example methods and apparatus disclosed herein provide alternatives to training models for unknown geographic areas of interest, thus avoiding training n models with m learning datasets for j unknown geographic areas of interest for t time. Examples disclosed herein provide advantages over data gathering techniques involving, for example, trained surveyors and/or monitoring applications. Examples disclosed herein reduce costs associated with determining geographic data and/or metadata using known techniques and provide estimations of metadata in areas difficult to sample with, for example, human surveyors, monitoring applications, and other known data gathering techniques.

Examples disclosed herein improve estimates of geographic and/or metadata in locations where data gathering is difficult. For example, gathering information in some locations using known manual techniques requires significant costs. Examples disclosed herein decrease the uncertainty of obtaining geographic and/or metadata and/or decrease the time investments required to obtain the geographic and/or metadata, thereby improving the practicability of performing sampling in such areas.

Example methods and apparatus disclosed herein employ aerial images and data derived from actual knowledge ("ground truth data," such as from manually sampling or using applications to monitor a known area) of known geographic areas (e.g., cities, towns, counties, countries, sections thereof, etc.) to create statistical models for geographic areas or interest (e.g., unknown cities, sections of unknown cities, unknown sections of known cities, unknown towns, sections of unknown towns, unknown sections of known towns, etc.) that are not and/or cannot be sampled directly by human surveyors and/or monitoring applications.

Example methods and apparatus disclosed herein utilize information (e.g., geographic data, geospatial data, metadata, set top box data, etc.) known for one or more areas to provide detailed analysis and/or prediction of behavior amongst individuals in one or more other areas for which such information is not available and/or partially available. For example, examples disclosed herein utilize known geospatial data such as geographic features (e.g., buildings, terrain, infrastructure, etc.), real estate developments (e.g., construction, housing, etc.), retail stores (e.g., number of stores within a given geographic area), resource density (e.g., water, forests, quarries, oil, minerals, labor, materials, etc.), city type (e.g., college town, international hub, port, etc.), city size and shape, and other geospatial information to develop, for example, predictive data and/or estimations for geographic areas for which little information is available. Additionally or alternatively, examples disclosed herein utilize geographic and metadata such as, for example, aggregate or partial demographics (e.g., household size, population density, gender and age distributions, etc.), inhabitant lifestyles, wealth (e.g., income, net worth, etc.), size (e.g., distance, population, etc.), store density (e.g., inventory, number of customers, etc.), section type (e.g., city center, suburb, exurb, etc.), data obtained from the Internet, surveying, or monitoring applications, and other types of metadata to supplement, for example, predictive data and/or estimations for geographic areas for which little information is available.

Some disclosed examples generate models for known geographic areas based on ground truth data from the known geographic areas using processes to train tree bootstrap aggregate ("bagger") decision trees, artificial neural networks ("neural nets"), and/or other ensemble machine learning algorithms. The example methods and apparatus also involve generating composite models based on the generated models of known geographic areas. In more specific examples, the models disclosed herein provide the ability to create accurate estimations and predictions on new, unseen geographic areas after having experienced a learning dataset (e.g., similar known geographic area(s)).

Some examples disclosed herein match an unknown geographic area to a known geographic area. In some examples, the matching is based on high level categorical data, such as categorical designations. For example, disclosed methods and apparatus match a type of the unknown geographic area (e.g., college town, port city, international hub, etc.) with one or more known geographic areas having a similar type. That is, examples disclosed herein recognize that an unknown college town is likely to be similar to other known college towns.

Further examples disclosed herein rank a plurality of known geographic areas from best match to worst match and associate weights accordingly. For example, models associated with a better matching geographic area are more prominent than models associated with a worse matching geographic area. In the illustrated example, a better match or a best match is determined by a known geographic area having a highest amount of affinities with the geographic area of interest. Even further, examples herein blend a plurality of known geographic areas by averaging, weighted averaging, using sector voting hypothesis, data fusion, aggregation, and other known blending techniques.

Additionally, example methods and apparatus match an unknown geographic area to a generated composite model. The matching is based on, in the illustrated example, high level information such as categorical designations. For example, the disclosed methods and apparatus match the unknown geographic area type(s) (e.g., college town, port city, international hub) with one or more composite models representing geographic areas having similar type(s). Examples include generating a prediction model for the unknown geographic area based on the generated models of the matching composite models.

Example methods and apparatus disclosed herein determine whether known geographic areas are representative of metadata of an unknown geographic area. Some disclosed examples identify any known geographic areas for which ground truth data has been obtained (e.g., ground truth data corresponding to areas that have been manually sampled or surveyed) that share common metadata with any metadata from the unknown geographic area.

These matching geographic areas, in some examples, each have statistical models associated therewith. Some disclosed examples take statistical models for a matching geographic area and associate the models with the unknown geographic area to predict and estimate an overall statistical model for the unknown geographic area. Other disclosed examples fuse each statistical models of each matching geographic area together using data fusion algorithms to predict and estimate an overall statistical model for the unknown geographic area. In the illustrated example, the models are representative of known granular data for the matching geographic area that is used to predict and estimate unknown granular data for the unknown geographic area.

Examples disclosed herein generate a prediction model for unknown geographic areas based on the generated models of matching known geographic areas. In some disclosed examples, these models are useful for predicting store densities (e.g., the number of stores in an arbitrarily sized area) and other parameters using surveying, satellite imagery, and other geospatial data. Additional or alternatively, examples disclosed herein predict media exposure and/or media consumption information (e.g., media ratings, media audiences, etc.) based on the generated data and/or previously collected information.

As used herein, the term "geographic area" is used as a preferably inhabited geographic area of interest. The term "geographic area" may be replaced with city, town, village, county, island, country, or other similar term without departing from the scope of the present disclosure. Additionally, the term "geographic area" and all its equivalents include sections thereof (e.g., city section, town section, village section, county section, island section, country section, etc.) even where "sections" are referred to separately.

Further, as used herein, the term "known geographic area" refers to a geographic area having at least a threshold amount of information required to create a statistical model of the geographic area, a geographic area previously modeled by one or more systems, a geographic area with models stored in a database, a geographic area with models accessible over a network, any combination thereof, etc.

Likewise, as used herein, the term "unknown geographic area" refers to a geographic area having insufficient data (e.g., less than a threshold amount of information) to create a statistical model of the geographic area, a geographic area not previously modeled, a geographic area without models stored in a database, a geographic area without models accessible over a network, any combination thereof, etc. (e.g., rural town, new developing city, country, or the like).

As used herein, the term "threshold amount of information," is meant to mean the amount of information required for the statistical model (e.g., a learning algorithm) to perform accurately on unseen tasks (e.g., accurately predicting outcomes for unknown geographic areas of interest).

FIG. 1 is a block diagram of an example environment 100 for estimating geographic area statistical models constructed in accordance with teachings of this disclosure. The example environment 100 includes a data collector 102, a geospatial collector 104, a metadata collector 106, a model trainer 108, a geographic area modeler 110, a geographic area matcher 112, a model mixer 114, a model database 116, and/or a network 118. In some examples, the data collector 102 aggregates geospatial data and/or metadata pertaining to a geographic area of interest. The example data collector 102 may collect data through the network 118. In some examples, the data collector 102 collects data using the geospatial collector 104 and the metadata collector 106. Of course, other types of collectors may also be included.

The example geospatial collector 104 collects geospatial data including, without limitation, geographic features (e.g., buildings, terrain, etc.), real estate developments (e.g., construction, housing, etc.), retail stores, resource density (e.g., water, workforce, materials, etc.), geographic area type (e.g., college town, international hub, port, etc.), geographic area shape, size, and/or other similar descriptive information. In some examples, geospatial data are collected using satellite imagery of the geographic area. Additionally or alternatively, geospatial data may be collected via the Internet, surveys or censuses from the geographic area of interest, or monitoring applications. In the illustrated example, the geospatial data are used to create predictive models of the geographic area from which the data was obtained.

In the example of FIG. 1, the metadata collector 106 collects geographic data and metadata including, for example, aggregate or partial demographics (e.g., household size, population density, gender and age distributions, etc.), inhabitant lifestyles, wealth (e.g., income, net worth, etc.), size (e.g., distance, population, etc.), store density (e.g., inventory, number of customers, etc.), section type (e.g., city center, suburb, exurb, etc.), and other types of information. In some examples, metadata are collected via the Internet, surveys or censuses from the geographic area of interest, or monitoring applications. In the illustrated example, the metadata are used to create predictive models of the geographic area from which the data was obtained.

In some examples, the data collector 102 collects data from a first geographic area (including geospatial data collected by the geospatial collector 104 and/or geographic and metadata collected by the metadata collector 106) and conveys the data related to the first geographic area to an example model trainer 108. Of course, the data collector 102 may collect data from any number of areas.

The example model trainer 108 trains a first plurality of models pertaining to the first geographic area based on the data (e.g., geospatial data, metadata, etc.) collected for the first geographic area. In some examples, the first plurality of models are bagger decision trees. The first plurality of models are neural nets in some examples. Of course, other machine learning approaches may be utilized without departing from the scope of the present disclosure. Even further, bagger decision trees, neural nets, and other machine learning approaches may be mixed and matched (e.g., decision trees in one model, neural nets in another model, average outcome of decision trees and neural nets in one model, etc.). After the first plurality of models have been trained, the first plurality of models are sent to the geographic area modeler 110, in the illustrated example.

In some examples, the data collector 102 collects geospatial data and/or geographic data and metadata for a second geographic area. The second geographic area, in these examples, may be an unknown geographic area (e.g., having less than a threshold amount of information). In some examples, the second geographic area may be a known geographic area with unknown datasets (e.g., a known city with unknown city sections). As previously discussed, the geospatial data are collected by the example geospatial collector 104 and the geographic data and metadata are collected by the example metadata collector 106. The data collected relating to the second geographic area is sent to the example geographic area modeler 110.

The example geographic area modeler 110 creates models of the second geographic area based on determinations by the geographic area matcher 112 in some examples, and based determinations by the model mixer 114 in some examples. In operation, the example geographic area matcher 112 determines when data elements of the second geographic area are similar to data elements of one or more geographic areas.

In some examples, when the second geographic area matches with the first geographic area in at least one data element, the example geographic area matcher 112 determines that data from the first geographic area can be used to populate, supplement, or otherwise represent the second geographic area.

In some examples, when the second geographic area matches with more than one geographic area in at least one data element, the example geographic area matcher 112 determines that data from all matching geographic areas can be used to populate, supplement, or otherwise represent the second geographic area. In such examples, the model mixer 114 aggregates or blends data from all matching geographic area to create a composite model.

In the illustrated example, the geographic area matcher 112 of the environment 100 is a part of the geographic area modeler 110. In some examples, the geographic area matcher 112 is separate from, but coupled with, the geographic area modeler 110. In some examples the model mixer 114 of environment 100 is a part of the geographic area modeler 110. In alternate examples, the model mixer 114 is separate from, but coupled with, the geographic area modeler 110.

In some examples, any models created by the geographic area modeler 110 are stored in the geographic area model database 116. The geographic area model database 116 stores known geographic area models (e.g., the plurality of models for the first geographic area), composite models (e.g., the result of mixing the plurality of models for the plurality of known geographic areas matching data from the second geographic area), and unknown geographic area models (e.g., models created by the geographic area modeler 110 that estimate the unknown geographic area).

In some examples, the geographic area model database 116, the geographic area modeler 110 (including the geographic area matcher 112 and model mixer 114 in some examples), the model trainer 108, and the data collector 102 are all connected to each other over the network 118. For example, the network 118 may be the Internet. The network 118 is wireless in some examples, wired in some examples, locally hosted in further examples, public in some examples, and any combination thereof. In some examples, geographic area models are stored off-site and accessible by components of the environment 100 through the example network 118. In some examples, the geographic area model database 116 is itself off-site to save memory and storage space in the environment 100.

Figure 2:
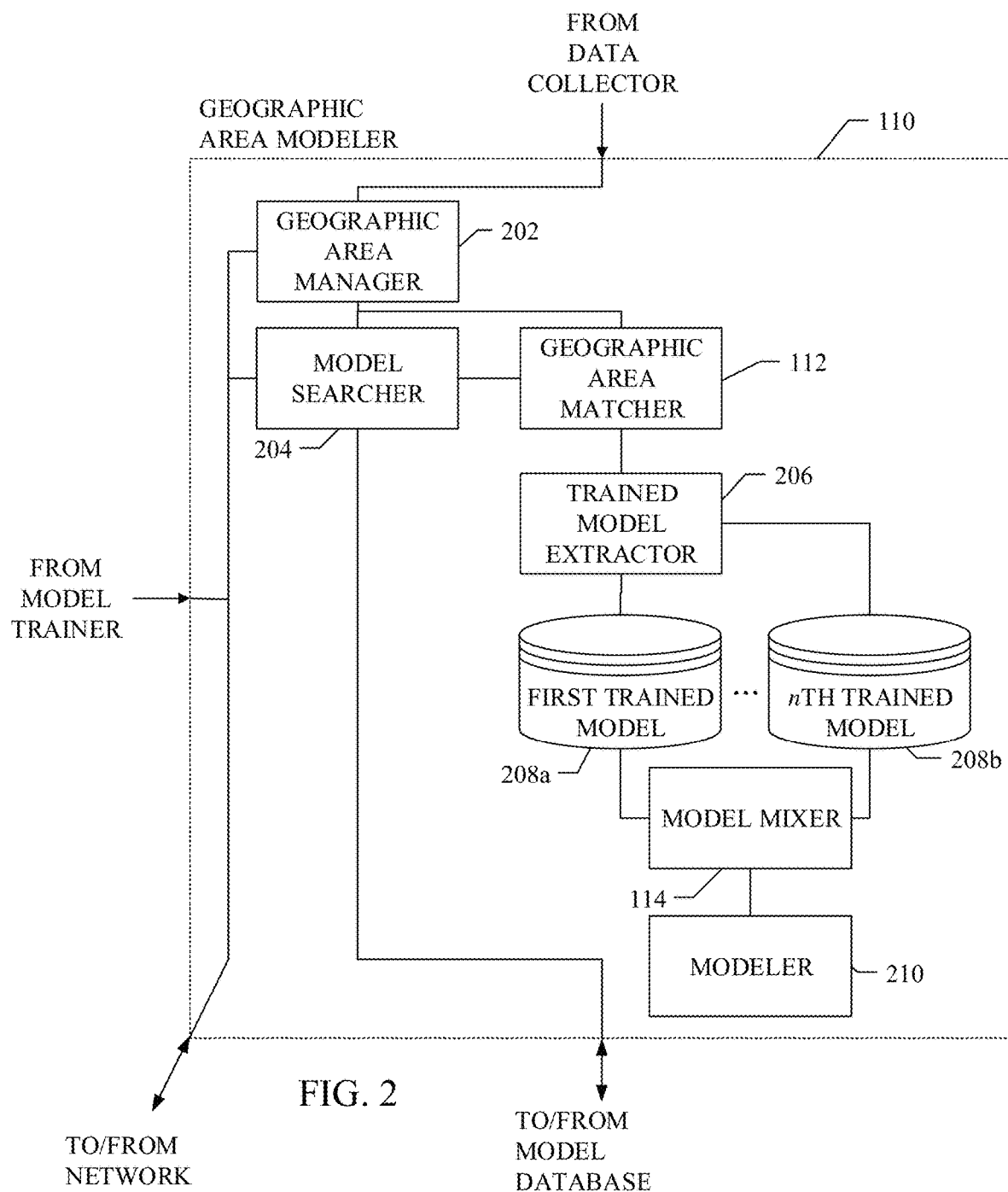
FIG. 2 is a block diagram of the example geographic area modeler of FIG. 1.

FIG. 2 is a block diagram of the example geographic area modeler 110 of FIG. 1. The geographic area modeler 110 includes an example geographic area manager 202, an example model searcher 204, the example area matcher 112, an example trained model extractor 206, example trained model databases 208a, 208b, the example model mixer 114, and an example modeler 210.

The example geographic area manager 202 receives data from the example model trainer 108, the example data collector 102, and/or the example network 118. In some examples, the example geographic area manager 202 receives data relating to the second geographic area. The received data are sent to the example model searcher 204 to find one or more similar known geographic areas (e.g., geographic areas previously modeled by the model trainer 108, geographic areas with models stored in the geographic area model database 116, geographic areas with models accessible over the network 118, etc.). The example geographic area matcher 112 compares a plurality of known geographic areas found by the example model searcher 204 with data collected from the second geographic area to determine if any of the plurality of known geographic areas are matches. In the illustrated example, the plurality of known geographic areas are matched with the second geographic area using high level information (e.g., geographic area type, location, etc.).

In some examples, only one known geographic area is determined to match the second geographic area. In some examples, the example trained model extractor 206 separates a plurality of models for the matching known geographic area (e.g., models possibly modeled by the example model trainer 108) and stores the plurality of models within the trained model databases 208a, 208b (e.g., any number of databases may be included from a first trained model database 208a to an nth trained model database 208b).

The example model mixer 114 uses data fusion algorithms to selectively mix the plurality of models from the matching known geographic area. In alternate examples, the model mixer 114 sends most or all of the plurality of models from the matching known geographic area to the example modeler 210. The example modeler 210 associates the plurality of models from the one matching known geographic area with the second geographic area to create a second plurality of models for the second geographic area.

In some examples, multiple known geographic areas are determined to match the second geographic area. The example trained model extractor 206 separates a plurality of models for the plurality of matching known geographic areas. Subsequently, the example model mixer 114 mixes the plurality of models for the plurality of matching known geographic areas (each of which were trained by the model trainer 108 in the illustrated example) to create a composite model. In some examples, the model mixer 114 uses data fusion algorithms to selectively mix the plurality of models from the plurality of matching known geographic areas. In alternate examples, the model mixer 114 aggregates the plurality of models from the plurality of matching known geographic areas to create an extensive composite model. The example modeler 210 associates the composite model with the second geographic area to create a model for the second geographic area.

In the illustrated example, the composite model is an accurate representation of the second geographic area (e.g., an unknown city where little geographic, geospatial, or metadata are known). The composite model provides predictions and estimations for an underdeveloped geographic area (e.g., a rural town where no geographic, geospatial, or metadata exists) in some examples. In even further examples, the composite model allows for simulation of a theoretical geographic area (e.g., a developing city, country, or the like).

Flowcharts representative of example machine readable instructions for implementing the example environment 100 of FIG. 1 and the example geographic area modeler 110 of FIG. 2 are shown in FIGS. 3-9. In these examples, the machine readable instructions comprise a program for execution by a processor such as the processor 1012 shown in the example processor platform 1000 discussed below in connection with FIG. 10.

While an example manner of implementing the example environment of FIG. 1 and the example geographic area modeler 110 of FIG. 2 are illustrated in FIGS. 3-9, one or more of the elements, processes and/or devices illustrated in FIGS. 3-9 may be combined, divided, re-arranged, omitted, eliminated and/or implemented in any other way. Further, the example data collector 102, the example geospatial collector 104, the example metadata collector 106, the example model trainer 108, the example geographic area modeler 100, the example geographic area matcher 112, the example model mixer 114, the example geographic area model database 116, the example network 118, and/or, more generally, the example environment 100 of FIG. 1; the example geographic area manager 202, the example model searcher 204, the example trained model extractor 206, the example trained model databases 208a, 208b, the example modeler 210, and/or, more generally, the example geographic area modeler 110 of FIG. 2 may be implemented by hardware, software, firmware and/or any combination of hardware, software and/or firmware. Thus, for example, any of the example the example data collector 102, the example geospatial collector 104, the example metadata collector 106, the example model trainer 108, the example geographic area modeler 100, the example geographic area matcher 112, the example model mixer 114, the example geographic area model database 116, the example network 118, and/or, more generally, the example environment 100 of FIG. 1; the example geographic area manager 202, the example model searcher 204, the example trained model extractor 206, the example trained model databases 208a, 208b, the example modeler 210, and/or, more generally, the example geographic area modeler 110 of FIG. 2 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example data collector 102, the example geospatial collector 104, the example metadata collector 106, the example model trainer 108, the example geographic area modeler 100, the example geographic area matcher 112, the example model mixer 114, the example geographic area model database 116, the example network 118, and/or, more generally, the example environment 100 of FIG. 1; the example geographic area manager 202, the example model searcher 204, the example trained model extractor 206, the example trained model databases 208a, 208b, the example modeler 210 and/or, more generally the example geographic area modeler 110 of FIG. 2 are hereby expressly defined to include a tangible computer readable storage device or storage disk such as a memory, a digital versatile disk (DVD), a compact disk (CD), a Blu-ray disk, etc. storing the software and/or firmware. Further still, the example environment 100 of FIG. 1 and the example geographic area modeler 110 of FIG. 2 may include one or more elements, processes and/or devices in addition to, or instead of, those illustrated in FIGS. 3-9, and/or may include more than one of any or all of the illustrated elements, processes and devices.

Flowcharts representative of example machine readable instructions for implementing the example environment 100 of FIG. 1 and the example geographic area modeler 110 of FIG. 2 are shown in FIGS. 3-9. In this example, the machine readable instructions comprise a program for execution by a processor such as the processor 1012 shown in the example processor platform 1000 discussed below in connection with FIG. 10. The program may be embodied in software stored on a tangible computer readable storage medium such as a CD-ROM, a floppy disk, a hard drive, a digital versatile disk (DVD), a Blu-ray disk, or a memory associated with the processor 1012, but the entire program and/or parts thereof could alternatively be executed by a device other than the processor 1012 and/or embodied in firmware or dedicated hardware. Further, although the example program is described with reference to the flowcharts illustrated in FIG. 3-9, many other methods of implementing the example environment 100 and the example geographic area modeler 110 may alternatively be used. For example, the order of execution of the blocks may be changed, and/or some of the blocks described may be changed, eliminated, or combined.

As mentioned above, the example processes of FIGS. 3-9 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and transmission media. As used herein, "tangible computer readable storage medium" and "tangible machine readable storage medium" are used interchangeably. Additionally or alternatively, the example processes of FIGS. 3-9 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and transmission media. As used herein, when the phrase "at least" is used as the transition term in a preamble of a claim, it is open-ended in the same manner as the term "comprising" is open ended.

Figure 3:
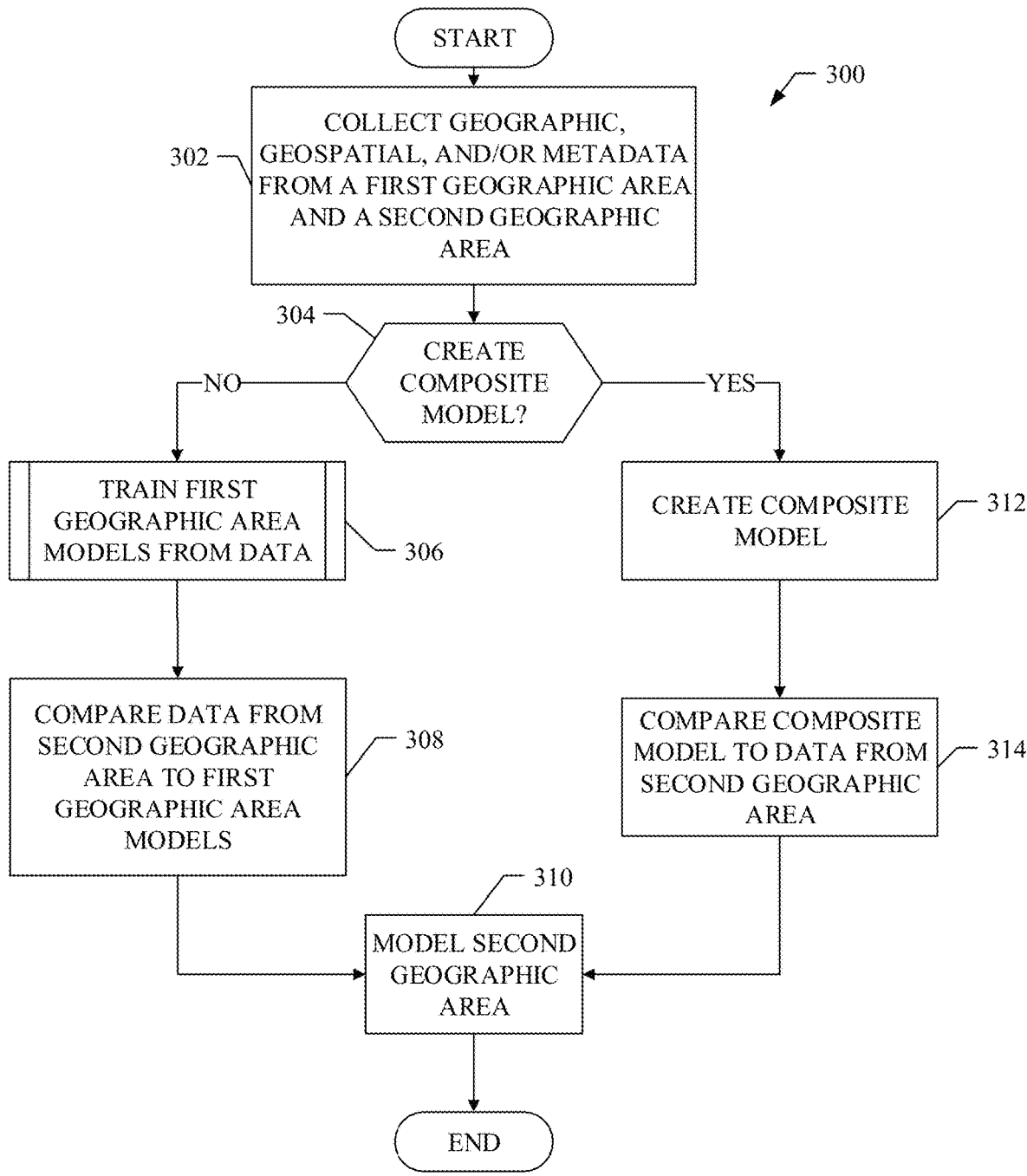
FIG. 3 is a flowchart representative of example machine readable instructions that may be executed to implement the example environment of FIG. 1 and apparatus of FIG. 2.

A flowchart representative of example machine readable instructions for implementing the environment 100 and the example geographic area modeler 110 of FIG. 2 is shown and described with reference to FIG. 3. An example program 300 begins at block 302. The example program 300 illustrates an example in which a model does not yet exist for a first geographic area, but at least a threshold amount of geographic data, geospatial data and/or metadata exists for the first geographic area. At block 302, the example data collector 102 collects geospatial data, through the geospatial collector 104, related to the first geographic area. In the illustrated example, the data collector 102 additionally collects geographic data and metadata, through the metadata collector 106, related to the first geographic area. In the illustrated example, the geographic data, geospatial data and/or metadata collected for the first geographic area meets or exceeds a threshold amount of information. In examples where one or more models exist for the first geographic area, such that it is considered a "known geographic area," the above mentioned examples related to collecting data may be skipped.

In some examples, the data collector 102 collects geographic data, geospatial data, and/or metadata, through the geospatial collector 104 and/or the metadata collector 104, relating to a second geographic area. Specifically, the example data collector 102 collects any data related to the second geographic area in order create associations with the first geographic area, as will be further described in detail below. In the illustrated example, the geographic data, geospatial data, and/or metadata collected for the second geographic area is less than a threshold amount of information. Of course, the data collector 102 may additionally collect other types of relevant data relating to the first and second geographic area other than the example geographic data, geospatial data, and metadata described herein.

After the example data collector 102 has collected any and/or all data (e.g., geographic, geospatial, metadata, etc.) for the first and second geographic areas, the example program 300 may create a composite model using the model mixer 114 (block 304). In some examples, a composite model represents an unknown geographic area better than would a single known geographic area. In some examples, the composite model may be used to model the second geographic area. In some examples, the composite model may be created for future use.

In some examples, the example program 300 opts out of creating a composite model (Block 304: NO), and control proceed to block 306. In such examples, the data collector 102 sends its data to the model trainer 108. The example model trainer 108 takes the data (e.g., geographic, geospatial, metadata, etc.) relating to the first geographic area and trains a plurality of models for the first geographic area (if no models exist for the first geographic area) (block 306). The plurality of models are bagger decisions trees in some examples. In some examples, the plurality of models are neural nets. In alternate examples, other known ensemble machine learning techniques or data mining algorithms may be used to train the plurality of models. As previously mentioned, if one or more models already exists for the first geographic area, then the above mentioned examples relating to training models may be skipped.

After the example model trainer 108 trains the plurality of models for the first geographic area at block 306 or if the plurality of models already exist for the first geographic area, the plurality of models for the first geographic area are sent to geographic area modeler 110. In some examples, the geographic area manager 202 of FIG. 2 receives the plurality of models for the first geographic area along with any data collected for the second geographic area from the data collector 102. Optionally, the example model searcher 204 searches for additional possible matching geographic areas, as will be explained in detail below. Control proceeds to block 308.

The example geographic area matcher 112 receives the data collected for the second geographic area from geographic area manager 202 and compares it to the plurality of models for the first geographic area trained by the example model trainer 108 (or obtained from the geographic area model database, via the network 118, etc.) (block 308). If data from the first geographic area (e.g., first geographic area type: port town) matches data from the second geographic area (e.g., second geographic area type: port town), then the example modeler 210 profiles an unknown geographic area by populating a first dataset for the second geographic area using the plurality of models for the first geographic area (block 310). In some examples, the second geographic area is modeled as a copy of the first geographic area. Therefore, the second geographic area is modeled with the example plurality of models for the first geographic area.

In some examples, the plurality of models for the first geographic area, the plurality of models for the second geographic area, and a log of matching geographic areas (e.g., first geographic area matches second geographic area) are sent from the geographic area modeler 110 to the geographic area model database 116. The geographic area model database 116 stores the log of matching geographic areas, models for geographic areas that have been previously modeled, and/or geographic areas that are modeled by the example environment 100 and the example geographic area modeler 110. After block 310, the example program 300 ceases. Of course, the example program 300 may be ran again for a different geographic area (or the same geographic area) many times thereafter.

In the illustrated example, the model searcher 204 locates a plurality of possible matching geographic areas (e.g., known cities, towns, counties, sections thereof, etc.) from at least one of the example data collector 102, the example model trainer 108, the example geographic area model database 116, and the example network 118. In some examples, the geographic area matcher 112 determines a subset of the plurality of possible matching geographic areas that actually match with data (e.g., high level categorical data, geographic, geospatial data, metadata, etc.) from the second geographic area. The example program 300 opts to create a composite model from the plurality of matching geographic areas (Block 304: YES). Control proceeds to block 312.

In the illustrated example, the geographic area matcher 112 locates a plurality of geographic area models from the plurality of matching geographic areas (e.g., the first geographic area, a third geographic area, a fourth geographic area, etc.). The example trained model extractor pulls the plurality of geographic area models from the plurality of matching geographic areas and stores them in the plurality of trained model databases 208a, 208b for use by the model mixer 114. In some examples, the model mixer 114 uses data fusion algorithms to selectively mix the plurality of models from the plurality of matching known geographic areas. In alternate examples, the model mixer 114 aggregates the plurality of models from the plurality of matching known geographic areas to create an extensive composite model (block 312).

In some examples, the model mixer 114 combines the plurality of models from the plurality of matching known geographic areas using data fusion algorithms to create a composite model. In some examples, the process of creating a composite model including a first set of models for a first matching geographic area and a second set of models for a second matching geographic area is called rebagging (e.g., a new "bag" is created consisting of bagger models from the first and second matching geographic areas).

In some examples, only data in common amongst the plurality of models is used to create the composite model (e.g., A≡B=>C; where "≡" means logic equality). In these examples, the composite model results in less models than each model for an individual geographic area (e.g., each geographic area has 50 models, but only 12 models are common between the plurality of matching geographic area models).

In some examples, the model mixer 114 blends the plurality of models filling in any blanks or unknowns amongst the plurality of matching known geographic areas (e.g., each geographic area has 50 models; 25 models from a first matching geographic area are combined with 25 models from a second matching geographic area). In these examples, the composite model results in the same number of models as each model for an individual geographic area.

In even further examples, the plurality of models from the plurality of matching known geographic areas are aggregated together (e.g., each geographic area has 50 models; 50 models from a first matching geographic area are combined with 50 models from a second matching geographic area). In these examples, the composite model results in more models than each model for an individual geographic area. Of course, other data fusion and logic may be applied when mixing or blending the plurality of models, such as, for example, conjunction, disjunction, negation, material implication, exclusive disjunction, and the like.

Additionally or alternatively, each matching geographic area may be weighted according to how similar each matching geographic area is to the geographic area of interest. In these examples, geographic areas with higher affinities (e.g., an expert match) to the geographic area of interest may have more models blended than geographic areas with lower affinities (e.g., novice match) to the geographic area (e.g., weighted averaging of model sets). Further, if a first matching geographic area has models that conflict with a second matching geographic area, the models from the geographic area with higher affinities to the geographic area of interest may be selected over the models from geographic area with lower affinities to the geographic area of interest (e.g., 35 models from a first matching geographic area are combined with 15 models form a second matching geographic area).

Additionally or alternatively, where a first matching geographic area has models that conflict with a second matching geographic area, a new model may be created from the weighted average of the individual conflicting models (e.g., weighted averaging of models within model set). For example, if 1 out of 50 models from the first matching geographic area conflicts with the second matching geographic area, then the composite model takes the 49 non-conflicting models and a weighted average of the conflicting model. After all the plurality of models from all the matching geographic areas have been mixed according to the blending principles set out above, the example model mixer 114 sends the composite model to the example modeler 210 (block 312).

In some examples, the model mixer 114 allocates the plurality of models from a matching geographic area to the composite model to start the mixing process. Subsequently, the example model mixer 114 pulls an additional plurality of models from another matching geographic area (e.g., from the third geographic area) and allocates the additional plurality of models from the other matching geographic area to the composite model. This process may repeat for as many iterations as there are matching geographic areas. Of course, any of the above mentioned blending techniques, their equivalents, or alternate known techniques may be applied to the aforementioned process. After all the plurality of models from all the matching geographic areas have been allocated to the composite model, the example model mixer 114 sends the composite model to the example modeler 210.

In some examples, the plurality of models utilized by the model mixer 114 are bagger decisions trees. In some examples, the plurality of models are neural nets. In alternate examples, other known ensemble machine learning techniques or data mining algorithms may be used as the plurality of models. The model mixer 114 mixes together similar ensemble machine learning techniques in some examples (e.g., mixing bagger trees with bagger trees, neural nets with neural nets, etc.). Additionally or alternatively, the model mixer 114 mixes together different ensemble machine learning techniques in some examples (e.g., mixing bagger trees with neural nets, neural nets with buckets of models, etc.).

Subsequently, the example modeler 210 compares the data collected for the second geographic area to the composite model created by the example model mixer 114 (block 314). In some examples, additional data, if available, may be used to verify the composite model is an accurate representation of the second geographic area. In some examples, additional iterations of the example program 300 may be needed if the verification step fails.

If data from the composite model accurately reflects the second geographic area, then the example modeler 210 populates a dataset for the second geographic area using the composite model (block 310). In these examples, the second geographic area is modeled as a copy of the composite model. In some examples, the composite model and the plurality of models from the second geographic area are sent from the geographic area modeler 110 to the geographic area model database 116. After block 310, the example program 300 ceases. Of course, the example program 300 may be ran again for a different geographic area (or the same geographic area) many times thereover.

Of course, the aforementioned process may be streamlined by allocating all the plurality of models from the matching geographic areas directly to the second geographic area in some examples without making a composite model. This may be considered a predictive process, while creating a composite model (block 312) and verifying the composite model matches (block 314) with the second geographic area (e.g., adding a verification step) may be considered an estimation process (e.g., has a higher probability of being accurate).

Figure 4:
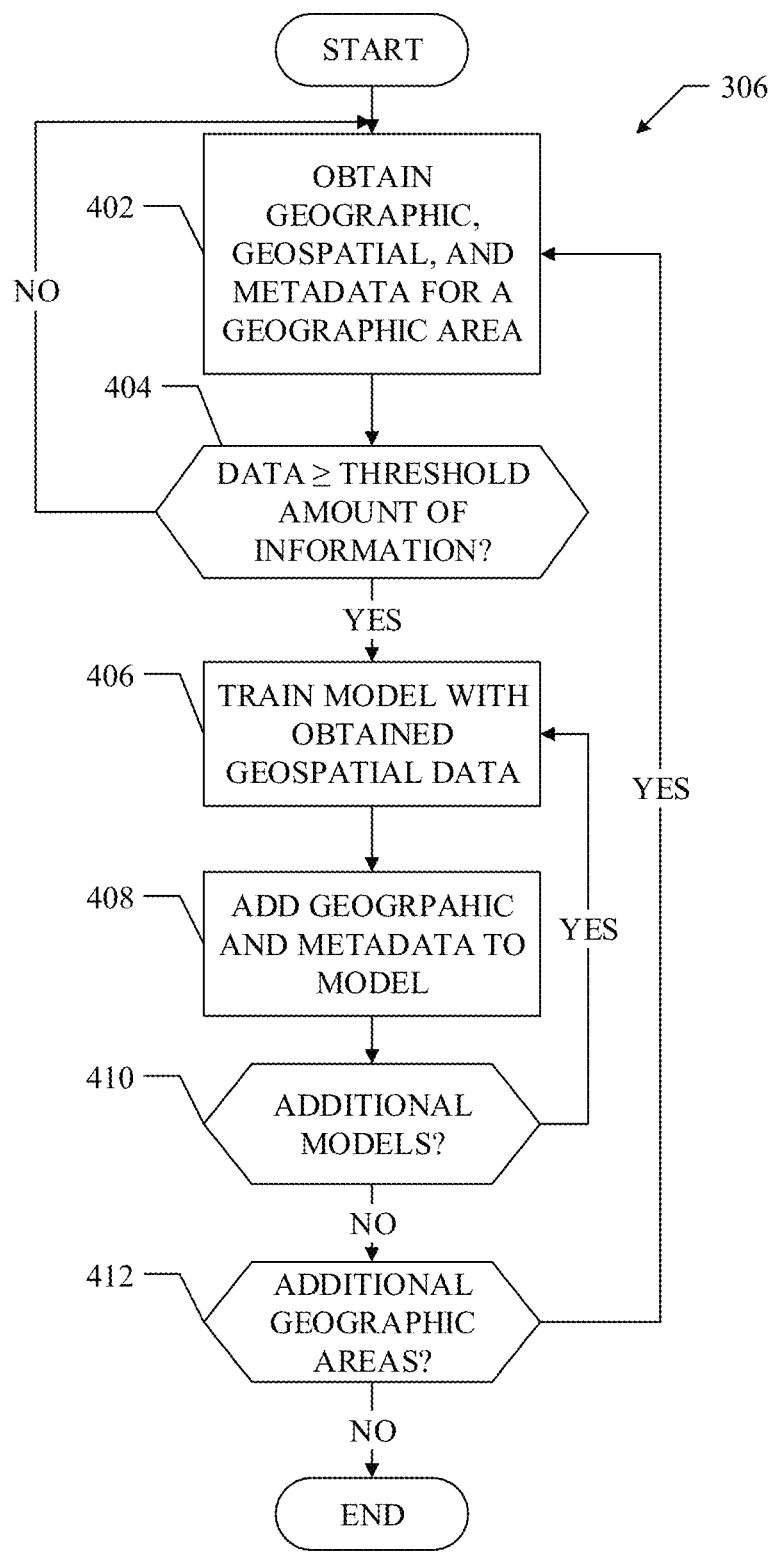
FIG. 4 is a flowchart representative of example machine readable instructions that may be executed to implement an example model trainer of FIG. 1.

A flowchart representative of example machine readable instructions for implementing the example model trainer 108 of FIG. 1 is shown in and described with reference to FIG. 4. Specifically, the instructions are an example implementation of block 306 from FIG. 3. The example implementation of block 306 begins at block 402. At block 402, the example data collector 102 collects geographic data, geospatial data, and metadata for a geographic area. If the collected geographic data, geospatial data and/or metadata meets or exceeds a threshold amount of information (block 404: YES), then control proceeds to block 406. Otherwise (block 404: NO), control returns to block 402. Any number of geographic areas may have data collected from them as needed. In the illustrated example, the environment 100 requires the data collector 102 to collect data from geographic areas. In alternate examples, geographic areas with existing data can be used at block 406 of the example implementation of block 306.

As previously discussed, the data collector 102 sends collected data to the example model trainer 108, in some examples. The example model trainer 108 trains a model (e.g., bagger decision tree, neural net, a combination thereof, etc.) for the geographic area based on high level categorical data, such as, for example, geospatial data collected from the data collector 102 (more specifically, the geospatial data collector 104). (Block 406).

The example model trainer 108 adds metadata (or other granular data) collected from the data collector 102, and more specifically, the metadata collector 106, to the trained model (block 408). If there are additional models to train (block 410: YES), control returns to block 406. In the illustrated example, this process continues for a iterations, where a is the number of models per geographic area to be trained. In some examples, fifty models per geographic area are trained. However, any number of models may be trained in order to accurately reflect the geographic area of interest. In some examples, the number of models to be trained is predetermined. In some examples, a user can choose the number of models that are to be trained as needed. If there are no additional models to train (block 410: NO), control proceeds to block 412.

At block 412, control returns to block 402 if there are additional geographic areas for which to train models (block 412: YES). In the illustrated example, this process continues for b iterations, where b is the number of geographic areas to be trained. In some examples, one thousand geographic areas are trained. However, any number of geographic areas may be trained in order to create a large heterogeneous mixture of geographic areas to choose from when estimating and predicting models for unknown geographic areas as described herein.

In the illustrated example, the environment 100 stores the plurality of models trained by the model trainer 108 in the geographic area model database 116. In some examples, the geographic area model database 116 is coupled with the model trainer 108. In some examples, similar to the one shown in FIG. 1, the geographic area model database 116 and the model trainer 108 may be connected via the network 118 (e.g., Internet, Intranet, Local Area Network, etc.).

If there are no more geographic areas to train (block 412: NO), the example implementation of block 306 ceases. It will be appreciated that the example implementation of block 306 provides a*b models to use for predicting and/or estimating a new, rural, theoretical, and/or otherwise unknown geographic area, city, town, county, country, etc.

In some examples, the example implementation of block 306 is ran prior to the example programs taught below, in order to train a plurality of models for a plurality of geographic areas where at least geographic data, geospatial data and/or metadata are known (e.g., thereby making the geographic areas "known" geographic areas for the purpose of the present disclosure). These trained models for the plurality of geographic areas may be stored and used in other programs, which are further detailed below.

Figure 5:
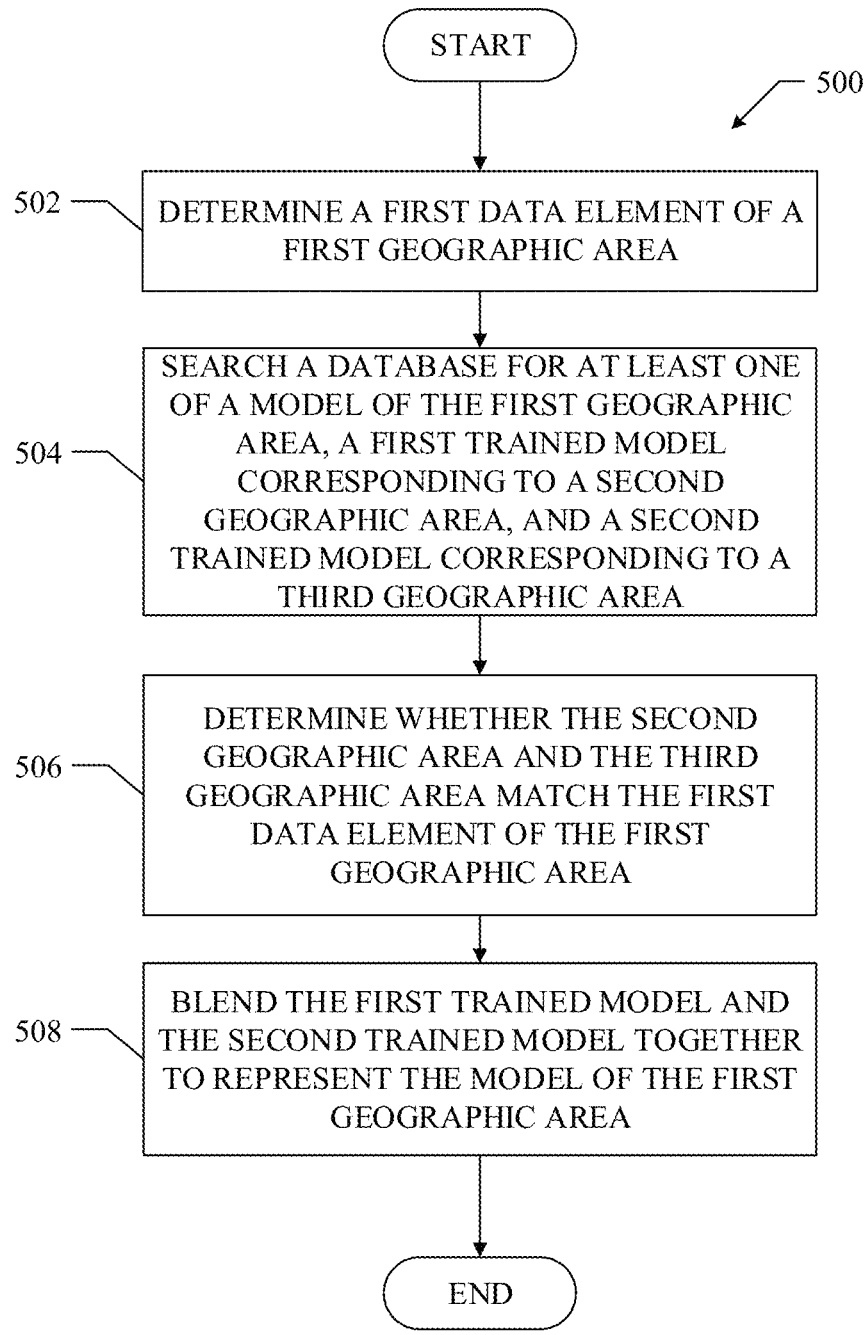
FIG. 5 is a flowchart representative of example machine readable instructions that may be executed to implement the example geographic modeler of FIG. 2

A flowchart representative of example readable instructions for implementing the example geographic modeler 110 of FIG. 2 is shown in and described with reference to FIG. 5. Specifically, the instructions are embodied in an example program 500. The example program 500 begins at block 502, where, in some examples, the geographic area manager 202 determines a first data element of a first geographic area (block 502). The example model searcher 204 searches a database for at least one of a model of the first geographic area, a first trained model corresponding to a second geographic area, and a second trained model corresponding to a third geographic area (block 504). Subsequently, the example geographic area matcher 112 determines whether the second geographic area and the third geographic area match the first data element of the first geographic area (block 506). In the illustrated example, the model mixer 114 then blends the first trained model and the second trained model together to represent the model of the first geographic area (block 508). Thereafter, the example program 500 ceases.

Figure 6:
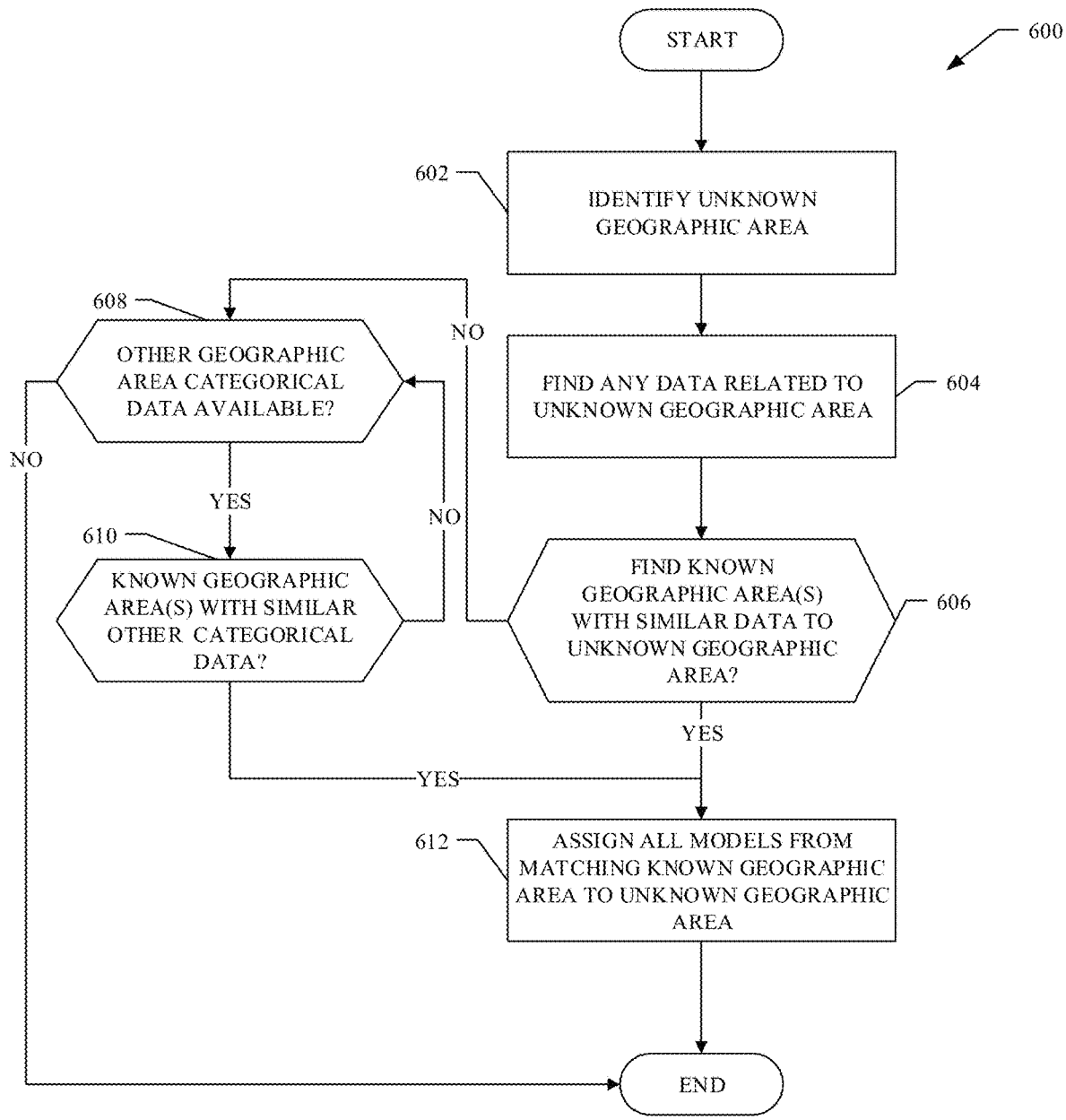
FIG. 6 is a flowchart representative of example machine readable instructions that may be executed to create a model for an unknown geographic area using the example geographic area modeler of FIG. 2.

A flowchart representative of example machine readable instructions for implementing the geographic area matcher 112 of FIGS. 1 and 2 is shown in and described with reference to FIG. 6. Specifically, an example program 600 begins at block 602. At block 602, an unknown geographic area (e.g., new, rural, theoretical, and/or otherwise unknown geographic area, section, etc.) is to be modeled. In the illustrated example, the data collector 102, through the geospatial data collector 104 and the metadata collector 106, collects any available data (e.g., high level categorical data) for the unknown geographic area (block 604).

The example data collector 102 sends the available data (e.g., high level categorical data) for the unknown geographic area to the example geographic area modeler 110, and more specifically, the example geographic area manager 202. The example geographic area manager 202 analyzes the available data for the unknown geographic area, and prompts the example model searcher 204 to search at least one of the example data collector 102, the example model trainer 108, the example geographic area model database 116, and the example network 118. In some examples, the model searcher 204 searches for models that are possible matches with the available data (e.g., high level categorical data) from the unknown geographic area. In some examples, the model searcher 204 searches for modeled geographic areas (e.g., towns, counties, countries, sections thereof, etc.) that are possible matches with the available data from the unknown geographic area. (Block 606). In the illustrated example, the geographic area type match query may be used for searching purposes. Of course, other datasets (e.g., easily discoverable high level categorical data) known to one skilled in the art may be used for searching and/or matching.

If no known geographic areas with similar metadata to the unknown geographic area is found (Block 606: NO), then control proceeds to block 608. At block 608, other geographic area categorical data are searched for using the data collector 102. If no more data for the unknown geographic area is available (block 608: NO), then the example program 600 ceases. Alternatively, if more data for the unknown geographic area is available (block 608: YES), then the example geographic area manager 202 analyzes the alternate available data for the unknown geographic area and prompts the example model searcher 204 to search for known geographic areas with data similar to the alternate available data (block 610). If no known geographic areas with data similar to the alternate available data are found (block 610: NO), control returns to block 608 to search for other alternate data for matching purposes.

In some examples, if a known geographic area with similar data to the unknown geographic area is found (block 606 or 610: YES), then the geographic area modeler 110 populates a model for the unknown geographic area by allocating all models from a matching geographic area to the unknown geographic area (block 612). In other words, the first geographic area is modeled with all the models from the matching geographic area. As discussed with reference to block 310 of FIG. 3, the allocating of models may be one implementation of modeling the geographic area. In the illustrated example, the models are representative of granular data for the matching geographic area that is used to predict and/or estimate granular data for the unknown geographic area. After block 612, the example program 600 ceases. Of course, the example program 600 may be ran again for a different geographic area (or the same geographic area) many times thereover.

Figure 7:
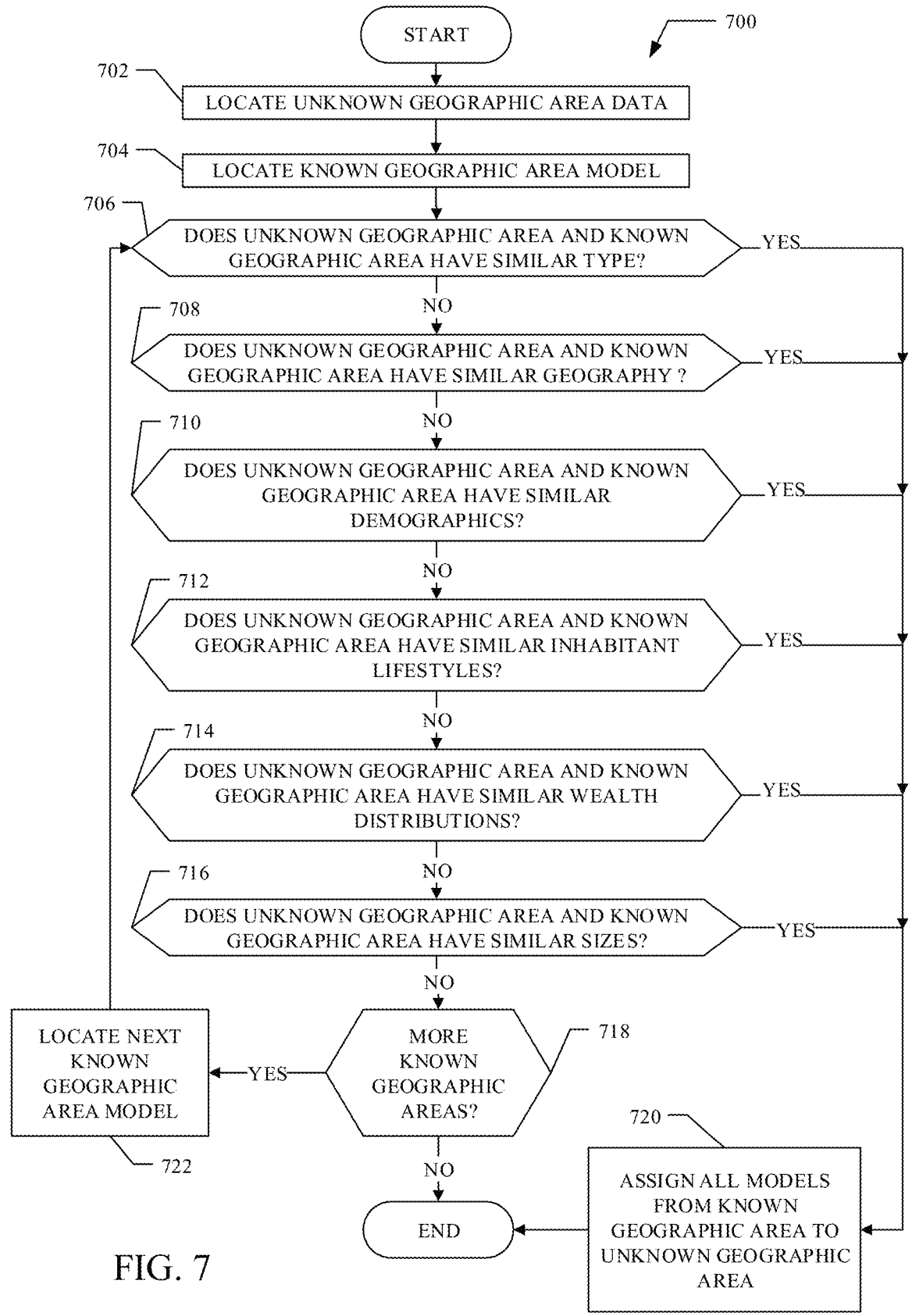
FIG. 7 is an alternate flowchart representative of example machine readable instructions that may be executed to create a model for an unknown geographic area using the example geographic area modeler of FIG. 2.
Figure 8:
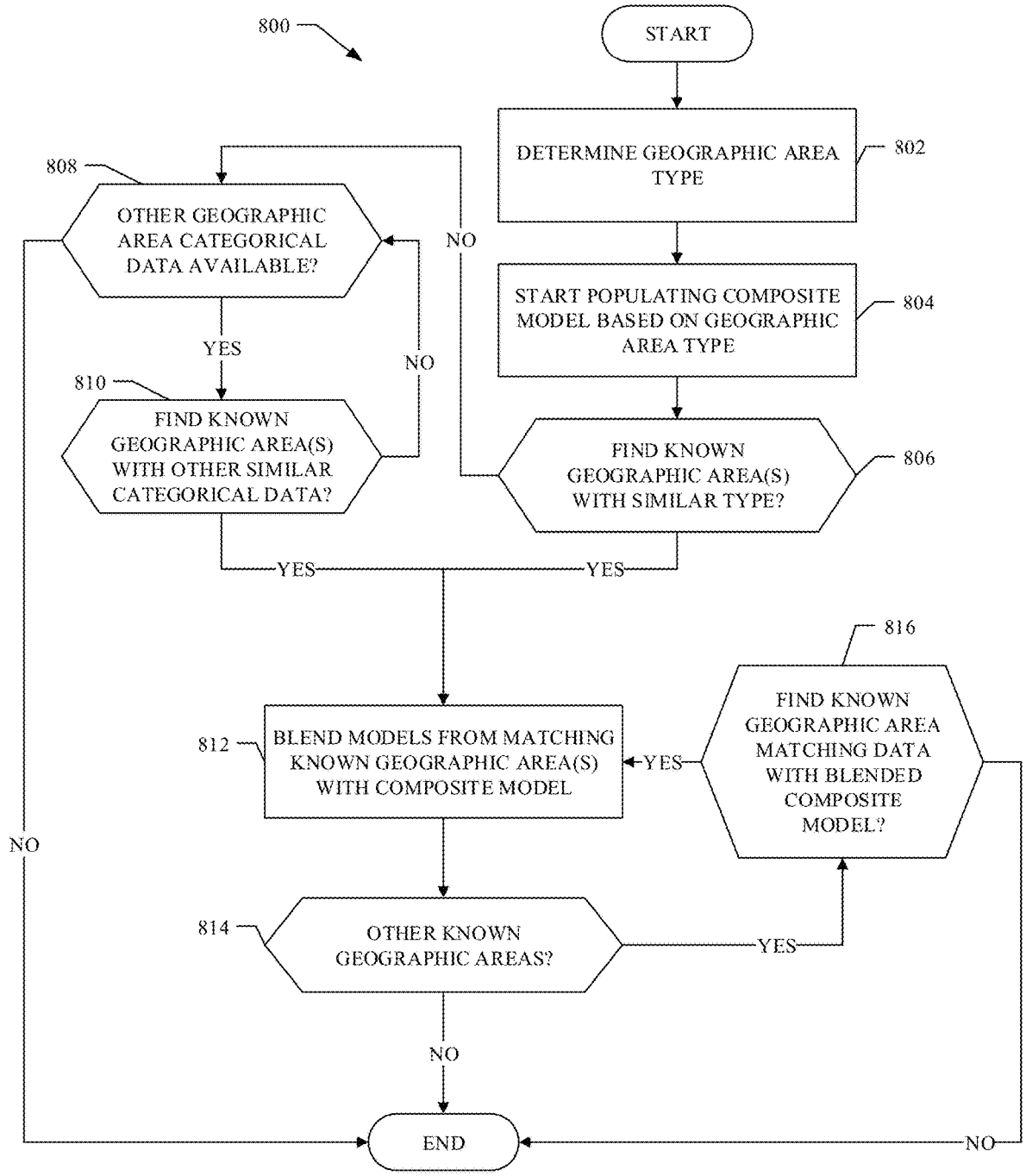
FIG. 8 is a flowchart representative of example machine readable instructions that may be executed to create a composite model for an unknown geographic area using the example geographic area modeler of FIG. 2.

An alternate flowchart representative of example machine readable instructions for implementing the geographic area modeler 110 is shown in and described with reference to FIG. 7. Specifically, an example program 700 begins at block 702. At block 702, the example geographic area manager 202 receives data collected from the example data collector 102 (e.g., geographic, geospatial and/or metadata) for an unknown (e.g., new) geographic area in order to create a model for the unknown geographic area based on the collected data.

At block 704, the example model searcher 204 searches for possible matching geographic areas (e.g., known cities, towns, counties, sections thereof, etc.) from at least one of the example data collector 102, the example model trainer 108, the example geographic area model database 116, and the example network 118. In some examples, the model searcher 204 sends possible matching geographic areas to the geographic area matcher 112. The example geographic area matcher 112 identifies the plurality of models associated with each geographic area. (Block 704). Once a first possible matching geographic area (e.g., one of the modeled known geographic areas) has been found, the example geographic area matcher 112 compares the first possible matching geographic area to the unknown geographic area.

In some examples, the geographic area matcher 112 determines whether the unknown geographic area and the first possible matching geographic area have similar geographic area types (e.g., college town, port city, international hub, etc.) (block 706). If the unknown geographic area and the first possible matching geographic area do have similar geographic area types (Block 706: YES), then control proceeds to block 720. If the unknown geographic area and the first possible matching geographic area do not have similar geographic area types (Block 706: NO), then control proceeds to block 708.

Additionally or alternatively, the example geographic area matcher 112 determines whether the unknown geographic area and the first possible matching geographic area have similar geographic area section types (e.g., suburb, exurb, city center, business district, etc.). If the unknown geographic area and the first possible matching geographic area do have similar geographic area section types (Block 706: YES), then control proceeds to block 720. If the unknown geographic area and the first possible matching geographic area do not have similar geographic area section types (Block 706: NO), then control proceeds to block 708.

In the illustrated example, the geographic area matcher 112 determines whether the unknown geographic area and the first possible matching geographic area have similar geography (using satellite imagery and other geospatial data, e.g., bodies of water, terrain, infrastructure, architecture, etc.) (block 708). If the unknown geographic area and the first possible matching geographic area do have similar geography (Block 708: YES), then control proceeds to block 720. If the unknown geographic area and the first possible matching geographic area do not have similar geography (Block 708: NO), then control proceeds to block 710.

In some examples, the geographic area matcher 112 determines whether the unknown geographic area and the first possible matching geographic area have similar demographics (e.g., age, gender, education, etc.) (block 710). If the unknown geographic area and the first possible matching geographic area do have similar demographics (Block 710: YES), then control proceeds to block 720. If the unknown geographic area and the first possible matching geographic area do not have similar demographics (Block 710: NO), then control proceeds to block 712.

In some examples, the geographic area matcher 112 determines whether the unknown geographic area and the first possible matching geographic area have similar inhabitant lifestyles (e.g., retail density (# of outlets per block), population (additionally or alternatively household or individual) spending habits, television viewership and ratings, house sizes, lot sizes, etc.) (block 712). If the unknown geographic area and the first possible matching geographic area do have similar inhabitant lifestyles (Block 712: YES), then control proceeds to block 720. If the unknown geographic area and the first possible matching geographic area do not have similar inhabitant lifestyles (Block 712: NO), then control proceeds to block 714.

In additional examples, the geographic area matcher 112 determines whether the unknown geographic area and the first possible matching geographic area have similar wealth distributions (e.g., income level, net worth, gross domestic product (GDP), resource density, etc.) (block 714). If the unknown geographic area and the first possible matching geographic area do have similar wealth distributions (Block 714: YES), then control proceeds to block 720. If the unknown geographic area and the first possible matching geographic area do not have similar wealth distributions (Block 714: NO), then control proceeds to block 716.

In further examples, the geographic area matcher 112 determines whether the unknown geographic area and the first possible matching geographic area have similar sizes (e.g., population, population density, radius, etc.) (block 716). If the unknown geographic area and the first possible matching geographic area do have similar sizes (Block 716: YES), then control proceeds to block 720. If the unknown geographic area and the first possible matching geographic area do not have similar sizes (Block 716: NO), then control proceeds to block 718.

Of course, additional match queries that are apparent to one of ordinary skill in the art may be added to further match the possible matching geographic area to the unknown geographic area. Even further, the match queries taught herein may be arranged in a different order than the example order presented in FIG. 6B. Thus, the present disclosure should not be limited by the queries presented herein and with regard to the example flowcharts.

If the unknown geographic area and the first possible matching geographic area have at least one similarity (e.g., one of blocks 706, 708, 710, 712, 714, or 716: YES), then the example geographic area modeler 110 assigns all of the models associated with the first possible matching geographic area to the unknown geographic area (block 720). As discussed with reference to block 310 of FIG. 3, the assigning of models may be one implementation of modeling the geographic area. Alternatively, the unknown geographic area and the first possible matching geographic area must match in geographic area type, geography, demographics, inhabitant lifestyles, wealth distribution, and size (e.g., all of the blocks 706, 708, 710, 712, 714, and 716: YES) before assigning the models as described above. Thereafter, the example program 700 ceases. Of course, the example program 700 may be ran again for a different unknown geographic area (or the same geographic area) many times thereover.

If the unknown geographic area and the possible matching geographic area have no similarities (e.g., all blocks 706, 708, 710, 712, 714, and 716: NO), then the example geographic area matcher 112 checks if there are any additional possible matching geographic areas (block 718). If there are other possible matching geographic areas (Block 718: YES), the example geographic area matcher 112 locates a second possible matching geographic area (block 722). In some examples, the geographic area matcher 112 further identifies the plurality of models associated with the second possible matching geographic area. Thereafter, control returns to block 706.

In the illustrated example, this process continues for c iterations, where c is the number of geographic areas with models that the geographic area matcher 112 receives from the model searcher 204. As previously discussed, the example model searcher 204 accesses at least the example data collector 102, the example model trainer 108, the example geographic area model database 116, and/or the example network 118 for previously modeled geographic areas (or alternate geographic areas of interest, sections thereof, etc.).

If there are no possible matching geographic areas or no other known geographic areas (Block 718: NO), the example program 700 ceases. Of course, the example program 700 may be ran again for a different unknown geographic area (or the same geographic area) many times thereover. The example program 600 and the example program 700 are meant to be used in connection with the example implementation of block 306. In the illustrated example, either program 600 or program 700 is ran subsequent to example implementation of block 306. In some examples, the program 600 and the program 700 match an unknown (e.g., new) geographic area with a known geographic area modeled by example implementation of block 306. Alternatively, the program 600 and the program 700 match an unknown (e.g., new) geographic area with a known geographic area modeled by another program or system.

In the illustrated example, a single known geographic area does not accurately reflect an unknown geographic area. In these examples, finding a plurality of geographic areas that, when combined, accurately reflect the unknown geographic area is required. A flowchart representative of example machine readable instructions for implementing the model mixer 114 is shown in and described with reference to FIG. 8. Specifically, an example process 800 is embodied in FIG. 8, which begins at block 802.

At block 802 a composite model is to be modeled. In some examples, a composite model is started by defining the geographic area type (e.g., college town, port city, international hub, etc.) for the composite model (block 802). Of course, as discussed herein, other high level categorical data may be used besides the geographic area type dataset. The geographic area type of the composite model is defined randomly in some examples, systematically in some examples, and/or based on an unknown geographic area to be modeled (whose geographic area type is known) in further examples. Of course, other methods of starting the composite model may be used without departing from the scope of the present disclosure.

In some examples, the geographic area modeler 110 (FIG. 2) uses the geographic area type defined in block 802 to start populating the composite model (block 804). In the illustrated example, one or more known geographic areas (e.g., geographic areas previously modeled by the model trainer 108, geographic areas with models stored in the geographic area model database 116, geographic areas with models accessible over the network 118, etc.) having a plurality of models that the example geographic area matcher 114 determines match the geographic area type (e.g., college town, port city, international hub, etc.) of the composite model. If the example geographic area matcher 112 finds such a geographic area (e.g., a first known geographic area) matching the geographic area type of the composite model (Block 806: YES), then control proceeds to block 812. If the example geographic area matcher 112 does not find any matching geographic areas (Block 806: NO), then the control proceeds to block 808. At block 808, other geographic area categorical data are searched for using the data collector 102. If no more data for the unknown geographic area is available (block 808: NO), then the example process 800 ceases. Of course, the example process 800 may be ran again for another composite model (or the same composite model) many times thereover.

Alternatively, if more data for the unknown geographic area is available (block 808: YES), then the example geographic area manager 202 (FIG. 2) analyzes the alternate available data for the unknown geographic area and prompts the example model searcher 204 to search for known geographic areas with data similar to the alternate available data (block 810). If no known geographic areas with data similar to the alternate available data are found (Block 810: NO), control returns to block 808 to search for other alternate data for matching purposes.

In some examples, example geographic area matcher 112 finds a plurality of matching geographic areas (block 806 or 810: YES). In some examples, the trained model extractor 206 stores a first trained model for a first matching geographic area in the first trained model database 208a, and stores a second trained model for a second matching geographic area in the second trained model database 208a. Of course, any number of databases may be used to store the plurality of models for the plurality of matching geographic areas.

In the illustrated example, the example model mixer 114 blends all of the plurality of models for the plurality of matching geographic areas at the same time (block 812). For example, the model mixer 114 (FIG. 2) mixes the first trained model from the first matching geographic area with the second trained model from the second matching geographic area. In some examples, the model mixer 114 uses data fusion algorithms to selectively mix the plurality of models from the plurality of matching known geographic areas. In some examples, the model mixer 114 aggregates the plurality of models from the plurality of matching known geographic areas.

In examples where a first known geographic area matches the defined composite model type, the trained model extractor 206 stores a first trained model for the first known geographic area in the first trained model database 208a, and stores a second trained model for the first known geographic area in the second trained model database 208a. The model mixer 114 blends the first and second trained models for the first known geographic area with the composite model to create a blended composite model (block 812). Similarly, the model mixer 114 uses data fusion algorithms in some examples and aggregates the plurality of models in some examples. Control proceeds to block 814.

In the illustrated example, a second known geographic area, which may or may not have matched previously (e.g., at block 806), may now match data with the newly blended plurality of models that make up the composite model. Therefore, if there are other known geographic areas (e.g., towns, counties, islands, countries, sections thereof, etc.) (block 814: YES) then control proceeds to block 816. If there are no more known geographic areas (block 814: NO), then the example process 800 ceases. Of course, the example process 800 may be ran again for another composite model (or the same composite model) many times thereover.

In some examples, the model searcher 204 searches for another known geographic area (e.g., the second known geographic area) that possibly matches the newly blended composite model (block 816). If the example geographic area matcher 112 does not find a matching geographic area (Block 816: NO), then the example process 800 ceases. Of course, the example process 800 may be ran again for another composite model (or the same composite model) many times thereover.

If the example geographic area matcher 112 finds a geographic area (e.g., the second known geographic area) that matches the blended composite model from the model searcher 204 search results (Block 816: YES), then control returns to block 812. In the illustrated example, this process continues for d iterations, where d is the number of matching known geographic areas (or geographic area sections) with models that the geographic area matcher 112 receives from the model searcher 204.

Throughout the d iterations, the composite model will be modeled by blending matching geographic areas' models directly with the composite model. In the illustrated example, each matching geographic area may be ranked and weighted according to how similar each matching geographic area is to the composite model. In specific examples, matching geographic areas may be ranked from best match to worst match and applied to the composite model in that order. In some examples, geographic areas with higher affinities to the composite model may have more models blended than geographic areas with lower affinities to the composite model (e.g., weighted averaging of model sets). Of course, other data fusion and blending techniques discussed herein may be applied similarly to the composite model.

As discussed above, once the example model mixer 114 has created the composite model, the plurality of models may be sent to the example modeler 210. In some examples, the modeler 210 takes the composite model and compares it to any data available for an unknown geographic area, which may be more than the initial high level categorical data used to generate the composite model (e.g., if additional data are available or has become available).

In some examples, the composite model matches with the available data for the unknown geographic area. Thus, the example modeler 210 assigns the composite model to the unknown geographic area. In the illustrated example, this estimates a model for the unknown geographic area.

In some examples, the composite model does not match with the available data for the unknown geographic area. In these examples, the composite model is stored in the geographic area model database 116 for future matching. The example process 800 may be ran again, an alternate program (e.g., example program 900) may be ran, or another known geographic area blending technique may be used as would be apparent to one having ordinary skill in the art.

Of course, the modeler 210 need not compare the composite model to data from the unknown geographic area. In some examples, the modeler 210 profiles an unknown geographic area by populating a model with all the plurality of models from matching known geographic areas, as discussed in an example program 900 below. This may be considered a predictive process, while creating a composite model and verifying the composite model matches with any additional information from the unknown geographic area may be considered an estimation process, which may create a presumption of being more accurate.

Figure 9:
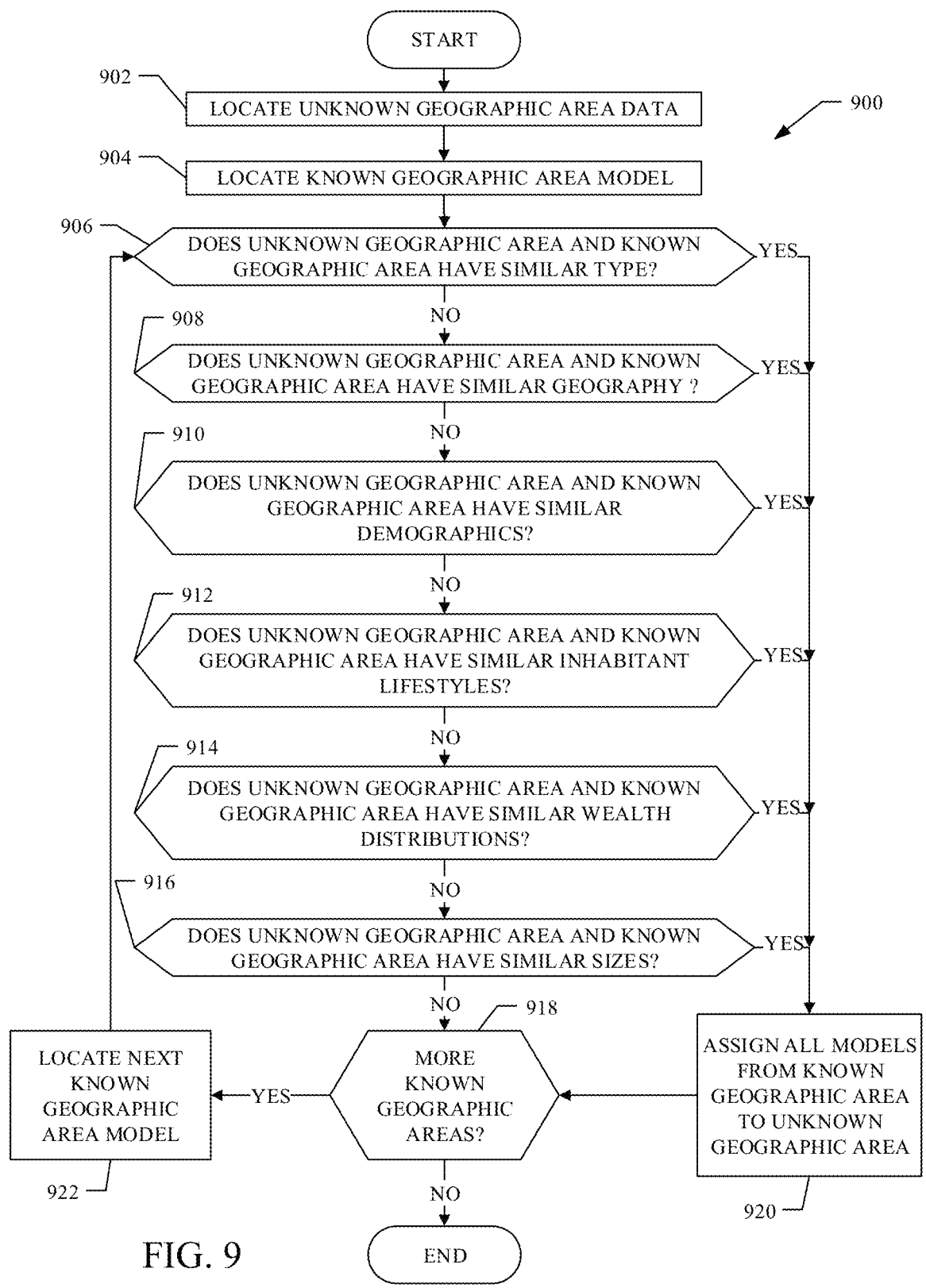
FIG. 9 is an alternate flowchart representative of example machine readable instructions that may be executed to create a composite model for an unknown geographic area using the example geographic area modeler of FIG. 2.

An alternate flowchart representative of example machine readable instructions for implementing the model mixer 114 is shown in and described with reference to FIG. 9. Specifically, the example process 900 may compare data from unknown geographic areas to known geographic areas to create a composite model. The example program 900 begins at block 902. At block 902, the example data collector 102 collects data (e.g., geographic, geospatial and/or metadata) for an unknown (e.g., new) geographic area in order to model the unknown geographic area. At block 904, the example model searcher 204 searches for possible matching geographic areas (e.g., known cities, towns, counties, sections thereof, etc.) from at least one of the example data collector 102, the example model trainer 108, the example geographic area model database 116, and the example network 118. In some examples, the geographic area matcher 112 identifies the plurality of models associated with each geographic area. (Block 714). Once a first possible matching geographic area (e.g., a known geographic area with a plurality of models) has been found, the example geographic area matcher 112 compares the first possible matching geographic area to the unknown geographic area.

In some examples, the geographic area matcher 112 determines whether the unknown geographic area and the first possible matching geographic area have similar geographic area types (e.g., college town, port geographic area, international hub, etc.) using an image representative of the unknown geographic area, a survey from the unknown geographic area, applications monitoring the unknown geographic area, and/or Internet entries regarding the unknown geographic area (block 906). If the unknown geographic area and the first possible matching geographic area do have similar geographic area types (Block 906: YES), then control proceeds to block 920. If the unknown geographic area and the first possible matching geographic area do not have similar geographic area types (Block 906: NO), then control proceeds to block 908.

Additionally or alternatively, the example geographic area matcher 112 determines whether the unknown geographic area and the first possible matching geographic area have similar geographic area section types (e.g., suburb, exurb, city center, business district, etc.) using an image representative of the unknown geographic area, a survey from the unknown geographic area, applications monitoring the unknown geographic area, and/or Internet entries regarding the unknown geographic area. If the unknown geographic area and the first possible matching geographic area do have similar geographic area section types, then control proceeds to block 920. If the unknown geographic area and the first possible matching geographic area do not have similar geographic area section types, then control proceeds to block 908.

In the illustrated example, the geographic area matcher 112 determines whether the unknown geographic area and the first possible matching geographic area have similar geography (e.g., bodies of water, terrain, infrastructure, architecture, etc.) using an image representative of the unknown geographic area, a survey from the unknown geographic area, applications monitoring the unknown geographic area, and/or Internet entries regarding the unknown geographic area (block 908). If the unknown geographic area and the first possible matching geographic area do have similar geography (Block 908: YES), then control proceeds to block 920. If the unknown geographic area and the first possible matching geographic area do not have similar geography (Block 908: NO), then control proceeds to block 910.

In some examples, the geographic area matcher 112 determines whether the unknown geographic area and the first possible matching geographic area have similar demographics (e.g., age, gender, education, etc.) using an image representative of the unknown geographic area, a survey from the unknown geographic area, applications monitoring the unknown geographic area, and/or Internet entries regarding the unknown geographic area (block 910). If the unknown geographic area and the first possible matching geographic area do have similar demographics (Block 910: YES), then control proceeds to block 920. If the unknown geographic area and the first possible matching geographic area do not have similar demographics (Block 910: NO), then control proceeds to block 912.

In some examples, the geographic area matcher 112 determines whether the unknown geographic area and the first possible matching geographic area have similar inhabitant lifestyles (e.g., retail density, population spending habits, television viewership and ratings, house sizes, lot sizes, etc.) using an image representative of the unknown geographic area, a survey from the unknown geographic area, applications monitoring the unknown geographic area, and/or Internet entries regarding the unknown geographic area (block 912). If the unknown geographic area and the first possible matching geographic area do have similar inhabitant lifestyles (Block 912: YES), then control proceeds to block 920. If the unknown geographic area and the first possible matching geographic area do not have similar inhabitant lifestyles (Block 912: NO), then control proceeds to block 914.

In additional examples, the geographic area matcher 112 determines whether the unknown geographic area and the first possible matching geographic area have similar wealth distributions (e.g., income level, net worth, gross domestic product (GDP), resource density, etc.) using an image representative of the unknown geographic area, a survey from the unknown geographic area, applications monitoring the unknown geographic area, and/or Internet entries regarding the unknown geographic area (block 914). If the unknown geographic area and the first possible matching geographic area do have similar wealth distributions (Block 914: YES), then control proceeds to block 920. If the unknown geographic area and the first possible matching geographic area do not have similar wealth distributions (Block 914: NO), then control proceeds to block 916.

In further examples, the geographic area matcher 112 determines whether the unknown geographic area and the first possible matching geographic area have similar sizes (e.g., population, population density, radius, etc.) using an image representative of the unknown geographic area, a survey from the unknown geographic area, applications monitoring the unknown geographic area, and/or Internet entries regarding the unknown geographic area (block 916). If the unknown geographic area and the first possible matching geographic area do have similar sizes (Block 916: YES), then control proceeds to block 920. If the unknown geographic area and the first possible matching geographic area do not have similar sizes (Block 916: NO), then control proceeds to block 918.

Of course, additional match queries that are apparent to one of ordinary skill in the art may be added to further match the first possible matching geographic area to the unknown geographic area. Even further, the match queries taught herein may be arranged in a different order than the example order presented in FIG. 9. Thus, the present disclosure should not be limited by the queries presented herein and illustrated in the example flowcharts.

If the unknown geographic area and the first possible matching geographic area have at least one similarity (e.g., one of blocks 906, 908, 910, 912, 914, or 916: YES), then the example geographic area modeler 110 assigns all of the models associated with the first possible matching geographic area to the unknown geographic area (block 920). As discussed with reference to block 310 of FIG. 3, the assigning of models may be one implementation of modeling the unknown geographic area. Thereafter, control proceeds to block 918.

Alternatively, the unknown geographic area and the first possible matching geographic area must match in geographic area type, geography, demographics, inhabitant lifestyles, wealth distribution, and size (e.g., all of the blocks 906, 908, 910, 912, 914, or 916: YES) bore assigning the models. Additionally or alternatively, geographic areas matching the unknown geographic area may be ranked based on the number of queries that each geographic area match with the unknown geographic area. In these examples, higher ranking geographic areas may be weighted higher that lower ranking geographic areas when it comes to mixing multiple geographic areas together to create a composite model.

If the unknown geographic area and the first possible matching geographic area have no similarities (e.g., all blocks 906, 908, 910, 912, 914, and 916: NO) and/or if the plurality of models for the first possible matching geographic area have been assigned to the unknown geographic area (block 920), then the example geographic area matcher 112 checks if there are any additional possible matching geographic areas (block 918). If there are other possible matching geographic areas (Block 918: YES), the example geographic area matcher 112 locates a second possible matching geographic area (block 922). In some examples, the geographic area matcher 112 further identifies the plurality of models associated with the second possible matching geographic area. Thereafter, control returns to block 906.

In the illustrated example, this process continues for e iterations, where e is the number of geographic areas with models that the geographic area matcher 112 receives from the model searcher 204. As previously discussed, the example model searcher 204 accesses at least the example data collector 102, the example model trainer 108, the example geographic area model database 116, and/or the example network 118 for previously modeled geographic areas (or alternate geographic areas of interest, sections thereof, etc.).

Throughout the e iterations, the unknown geographic area will be modeled by adding any matching models from a geographic area to the models for the unknown geographic area (e.g., composite model), without regard to whether the matching geographic areas match each other, in some examples. In the illustrated example, this process creates a plurality of models for the unknown geographic area that accurate represents the unknown geographic area.

If there are no other possible matching geographic areas (Block 918: NO), the example program 900 ceases. Of course, the example program 900 may be ran again for a different unknown geographic area (or the same geographic area) many times thereover. The example program 800 and the example program 900 are meant to be used in connection with the example implementation of block 306 and/or the example programs 600 and 700. In the illustrated example, either the example program 800 or program 900 is ran subsequent to example implementation of block 306. In some examples, the example program 800 and program 900 are run concurrently with programs 600 and 700. In some examples, the example program 800 and the program 900 match an unknown (e.g., new) geographic area with a plurality of known geographic areas modeled by example implementation of block 306.

Figure 10:
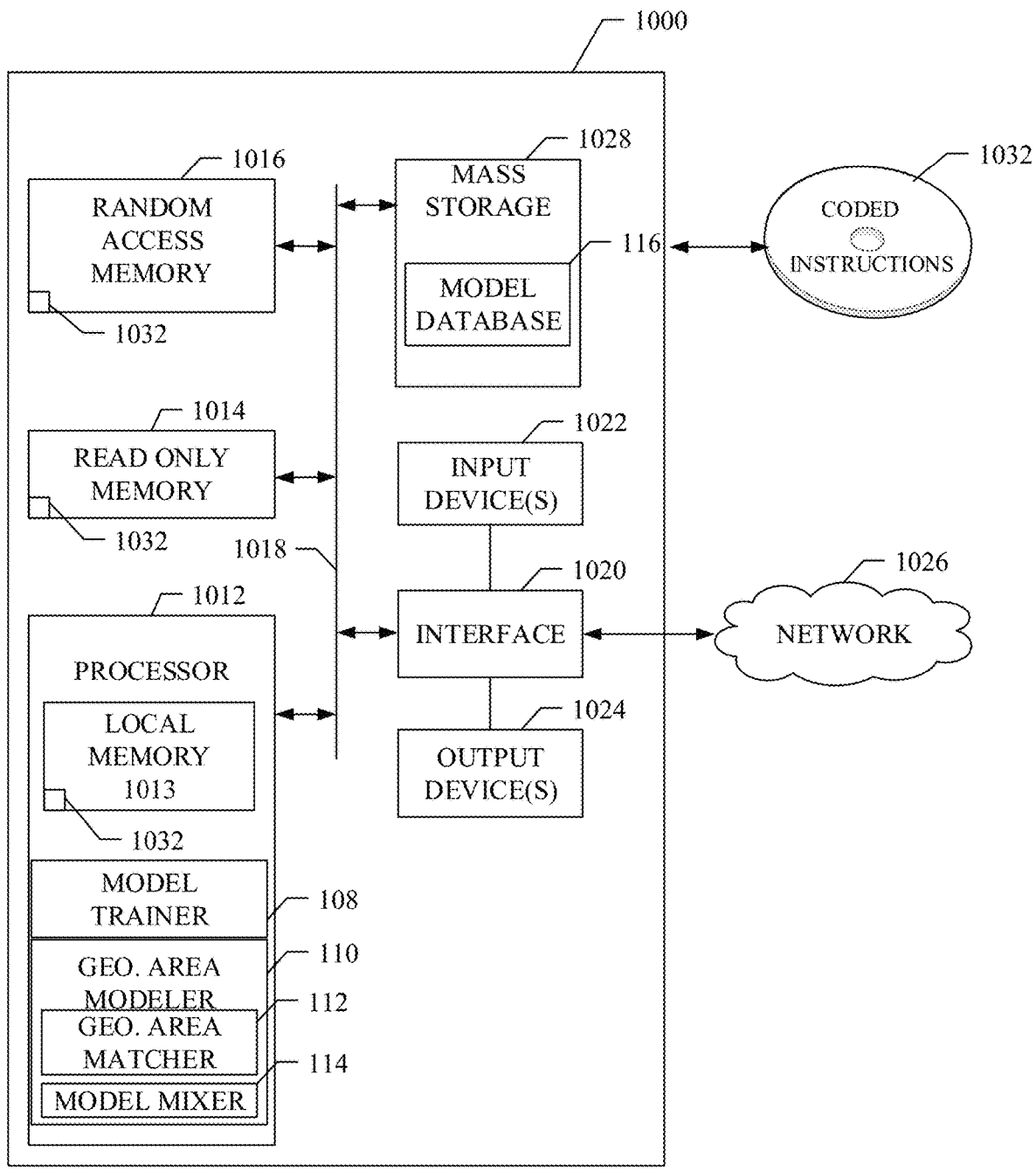
FIG. 10 is a block diagram of an example processing system capable of implementing the environment of FIG. 1 and the example apparatus of FIG. 2 by executing the example machine readable instructions of FIGS. 3-9.

FIG. 10 is a block diagram of an example processor platform 1000 capable of executing the instructions of FIGS. 3-9 to implement the example environment 100 of FIG. 1 and the example geographic area modeler 110 of FIG. 2. The processor platform 1000 can be, for example, a server, a personal computer, a mobile device (e.g., a cell phone, a smart phone, a tablet such as an iPad™), a personal digital assistant (PDA), an Internet appliance, a gaming console, a set top box, or any other type of computing device.

The processor platform 1000 of the illustrated example includes a processor 1012. The processor 1012 of the illustrated example is hardware. For example, the processor 1012 can be implemented by one or more integrated circuits, logic circuits, microprocessors or controllers from any desired family or manufacturer.

The processor 1012 of the illustrated example includes a local memory 1013 (e.g., a cache). The example processor 1012 further includes the example model trainer 108, the example geographic area modeler 110, the example geographic area matcher 112, and the example model mixer 114.

The processor 1012 of the illustrated example is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit 1020 may be implemented by any type of interface standard, such as an Ethernet interface, a universal serial bus (USB), and/or a PCI express interface.

In the illustrated example, one or more input devices 1022 are connected to the interface circuit 1020. The input device(s) 1022 permit(s) a user to enter data and commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 1020 of the illustrated example, thus, typically includes a graphics driver card, a graphics driver chip or a graphics driver processor.

The interface circuit 1020 of the illustrated example also includes a communication device such as a transmitter, a receiver, a transceiver, a modem and/or network interface card to facilitate exchange of data with external machines (e.g., computing devices of any kind) via a network 1026 (e.g., an Ethernet connection, a digital subscriber line (DSL), a telephone line, coaxial cable, a cellular telephone system, etc.).

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives, RAID systems, and digital versatile disk (DVD) drives.

The coded instructions 1032 of FIGS. 3-9 may be stored in the local memory 1013, in the mass storage device 1028, in the volatile memory 1014, in the non-volatile memory 1016, and/or on a removable tangible computer readable storage medium such as a CD or DVD.

Even further, the geographic area model database 116 may be contained in the local memory 1013, in the mass storage device 1028, in the volatile memory 1014, in the non-volatile memory 1016, and/or on a removable tangible computer readable storage medium such as a flash drive, external hard drive, CD, DVD, and their equivalents.

From the foregoing, it will be appreciated that the above disclosed example methods and apparatus profile geographic areas in such a way to reduce the costs and time investments associated with determining geographic data, geospatial data and/or metadata of unknown geographic areas. The example methods and apparatus further increase the certainty of geographic data, geospatial data and/or metadata applications in unknown geographic areas.

Further, the example methods and apparatus estimate geographic data and/or metadata more quickly than performing sampling or surveying. For example, manually sampling or surveying detailed geographic data, and/or metadata for every unknown geographic area in the world would be a monstrosity of an undertaking that is impracticable if not impossible during one's lifetime. Even further, creating statistical models based on the manually sampled or surveyed detailed geospatial data and/or metadata for every unknown geographic area requires training of the models. The above disclosed example methods and apparatus avoid training n models with m learning datasets for j unknown geographic areas of interest for t time, while providing estimations and/or predictions of the geospatial data and/or metadata in unknown geographic areas. Even further, example methods and apparatus provide estimates of geographic data, geospatial data and/or metadata in areas that cannot be sampled directly. The geographic data, geospatial data and/or metadata estimated by example methods and apparatus disclosed herein may be used to, for example, identify emerging markets and/or a developing potential for marketing goods and services to an underserved or otherwise unknown location.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method, comprising:

creating in a model database, by executing an instruction with at least one processor, a first dataset representative of a first geographic area based on a first data element, the first dataset having less than a threshold amount of information;

identifying within the model database, by executing an instruction with the at least one processor, a second dataset including a first set of machine learning models trained with information representative of a second geographic area, the identification based on a first determination that the second geographic area includes a second data element that matches the first data element of the first geographic area, the second geographic area including a first affinity corresponding to the first geographic area, the first set of machine learning models to predict consumer information for the second geographic area;

identifying within the model database, by executing an instruction with the at least one processor, a third dataset including a second set of machine learning models trained with information representative of a third geographic area, the identification based on a second determination that the third geographic area includes a third data element that matches the first data element of the first geographic area, the third geographic area including a second affinity corresponding to the first geographic area, the second set of machine learning models to predict consumer information for the third geographic area;

when a first one of the first set of machine learning models conflicts with the second set of machine learning models, combining, by executing an instruction with the at least one processor, (a) non-conflicting ones of the first set of machine learning models included in the second dataset and (b) the second set of machine learning models included in the third dataset to generate a composite set of machine learning models, the composite set of machine learning models excluding the first one of the first set of machine learning models that conflicted with the second set of machine learning models based on a third determination that the first affinity is less than the second affinity; and in response to determining that the composite set of machine learning models represents the first geographic area, reducing computational complexity of profiling the first geographic area by profiling a third machine learning model of the first geographic area by inserting into the first dataset for the first geographic area, by executing an instruction with the at least one processor, data from the composite set of machine learning models such that an amount of information in the first dataset satisfies the threshold amount of information, the third machine learning model predicting consumer information for the first geographic area.

2. A method as defined in claim 1, wherein at least one of the second dataset or the third dataset is trained using machine learning algorithms prior to the combining of the non-conflicting ones of the first set of machine learning models of the second dataset and the second set of machine learning models of the third dataset.

3. A method as defined in claim 1, wherein the first data element of the first geographic area is determined based on at least one of satellite imagery of the first geographic area, a survey or census related to the first geographic area, applications monitoring the first geographic area, or Internet entries related to the first geographic area.

4. A method as defined in claim 1, wherein inserting data into the first dataset for the first geographic area from the composite set of machine learning models includes adding an estimation of an aspect of the first geographic area to the first dataset, the estimation based on the composite set of machine learning models.

5. A method as defined in claim 1, wherein the first data element is at least one of a type, a geography, a demographic, an inhabitant lifestyle, a wealth distribution, a size, or a shape.

6. A method as defined in claim 1, wherein the non-conflicting ones of the first set of machine learning models of the second dataset and the second set of machine learning models of the third dataset are combined using data fusion algorithms.

7. A method as defined in claim 1, wherein the threshold amount of information is an amount of information required for a learning algorithm to perform accurately on unseen tasks.

8. A tangible computer readable storage medium, comprising instructions that, when executed, cause a machine to at least:
identify a first geographic area for which a model database does not include a machine learning model, the first geographic area including a first data element;
identify a first set of trained machine learning models corresponding to a second geographic area, the second geographic area including a second data element that matches the first data element of the first geographic area, the second geographic area including a first affinity corresponding to the first geographic area, the first set of trained machine learning models to predict consumer information for the second geographic area;
identify a second set of trained machine learning models corresponding to a third geographic area, the third geographic area including a third data element that matches the first data element of the first geographic area, the third geographic area including a second affinity corresponding to the first geographic area, the second set of trained machine learning models to predict consumer information for the third geographic area;
when a first one of the first set of trained machine learning models conflicts with the second set of trained machine learning models, mix (a) non-conflicting ones of the first set of trained machine learning models and (b) the second set of trained machine learning models to generate a composite set of machine learning models, the composite set of machine learning models excluding the first one of the first set of trained machine learning models that conflicted with the second set of trained machine learning models based on a determination that the first affinity is less than the second affinity; and
in response to determining that the composite set of machine learning models represents the first geographic area, reduce computational complexity of profiling the first geographic area by using the composite set of machine learning models to represent the first geographic area in the model database with a third machine learning model trained by the composite set of machine learning models, the composite set of machine learning models predicting consumer information for the first geographic area.

9. A storage medium as defined in claim 8, wherein the first data element of the first geographic area is determined based on at least one of satellite imagery of the first geographic area, a survey or census related to the first geographic area, applications monitoring the first geographic area, or Internet entries related to the first geographic area.

10. A storage medium as defined in claim 8, wherein the first data element is at least one of a type, a geography, a demographic, an inhabitant lifestyle, a wealth distribution, a size, or a shape.

11. A storage medium as defined in claim 8, wherein the instructions further cause the machine to:
determine a fourth data element of the first geographic area based on at least one of an image representative of the first geographic area, a survey from the first geographic area, applications monitoring the first geographic area, or the Internet; and
verify that the first set of trained machine learning models corresponding to the second geographic area includes the fourth data element.

12. A storage medium as defined in claim 11, wherein when the second set of trained machine learning models corresponding to the third geographic area does not have the second data element, the instructions further cause the machine to mix the non-conflicting ones of the first set of trained machine learning models and the second set of trained machine learning models using data fusion algorithms.

13. A storage medium as defined in claim 8, wherein the non-conflicting ones of the first set of trained machine learning models and the second set of trained machine learning models are mixed by aggregating the non-conflicting ones of the first set of trained machine learning models and the second set of trained machine learning models together.

14. A storage medium as defined in claim 8, wherein the composite set of machine learning models satisfies a threshold amount of information required for a machine learning algorithm to perform accurately on unseen tasks.

15. A hardware-implemented apparatus, comprising:
a geographic area manager to determine a first data element of a first geographic area;
a model searcher to determine whether a model database includes a first set of trained machine learning models corresponding to a second geographic area and a second set of trained machine learning models corresponding to a third geographic area, the first set of trained machine learning models to predict consumer information for the second geographic area, the second set of trained machine learning models to predict consumer information for the third geographic area;

a geographic area matcher to determine (a) whether the second geographic area includes a second data element that matches the first data element of the first geographic area and (b) whether the third geographic area includes a third data element that matches the first data element of the first geographic area, the second geographic area including a first affinity corresponding to the first geographic area, the third geographic area including a second affinity corresponding to the first geographic area;

a trained model extractor to extract, from the model database, the first set of trained machine learning models corresponding to the second geographic area and the second set of trained machine learning models corresponding to the third geographic area; and a model mixer to:

when a first one of the first set of trained machine learning models conflicts with the second set of trained machine learning models, blend (a) non-conflicting ones of the first set of trained machine learning models and (b) the second set of trained machine learning models together into a blended set of machine learning models to represent the first geographic area, the blended set of machine learning models excluding the first one of the first set of trained machine learning models that conflicted with the second set of trained machine learning models based on a determination that the first affinity is less than the second affinity; and in response to determining that the blended set of machine learning models represents the first geographic area, reduce computational complexity of profiling the first geographic area with a third machine learning model by inserting into a first dataset for the first geographic area, data from the blended set of machine learning models such that an amount of information in the first dataset satisfies a threshold amount of information, the third machine learning model predicting consumer information for the first geographic area.

16. An apparatus as defined in claim 15, wherein the first data element is at least one of a type, a geography, a demographic, an inhabitant lifestyle, a wealth distribution, a size, or a shape.

17. An apparatus as defined in claim 15, wherein the model mixer is to blend the non-conflicting ones of the first set of trained machine learning models and the second set of trained machine learning models using data fusion algorithms.

18. An apparatus as defined in claim 15, wherein the first set of trained machine learning models include a bootstrap aggregate decision tree learning algorithm and the second set of trained machine learning models include an artificial neural network learning algorithm.

19. An apparatus as defined in claim 15, wherein the geographic area manager is to determine a fourth data element of the first geographic area based on at least one of an image representative of the first geographic area, a survey from the first geographic area, applications monitoring the first geographic area, or the Internet, and further wherein the geographic area matcher is to verify that at least one of the second geographic area includes a fifth data element or the third geographic area includes a sixth data element that matches the fourth data element of the first geographic area.

20. An apparatus as defined in claim 19, wherein when the second geographic area includes the fifth data element that matches the fourth data element of the first geographic area and the third geographic area does not include the sixth data element that matches the second data element of the first geographic area, the geographic area matcher to determine the second geographic area is a better match to the first geographic area than the third geographic area.

\* \* \* \* \*